(12) United States Patent
Lee et al.

(10) Patent No.: US 9,804,742 B2
(45) Date of Patent: Oct. 31, 2017

(54) MOBILE TERMINAL AND CONTROL METHOD THEREOF

(71) Applicant: LG ELECTRONICS INC., Seoul (KR)

(72) Inventors: Younghoon Lee, Seoul (KR); Minjin Lee, Seoul (KR); Shinjun Park, Seoul (KR); Jungbin Lee, Seoul (KR); Minsoo Park, Seoul (KR); Soyeon Yim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 14/593,854

(22) Filed: Jan. 9, 2015

(65) Prior Publication Data

US 2015/0128092 A1 May 7, 2015

Related U.S. Application Data

(63) Continuation of application No. 13/225,730, filed on Sep. 6, 2011, now Pat. No. 8,965,459.

(30) Foreign Application Priority Data

Sep. 17, 2010 (KR) .................. 10-2010-0091718
Sep. 17, 2010 (KR) .................. 10-2010-0091720

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0481* (2013.01); *G06F 3/04842* (2013.01);
(Continued)

(58) Field of Classification Search
CPC ............... G06F 3/0482; G06F 3/04842; G06F 3/04883; G06F 3/0481; H04M 1/72544; H04M 2250/22
(Continued)

(56) References Cited

U.S. PATENT DOCUMENTS

2005/0114796 A1* 5/2005 Bast ...................... G06F 3/0338
715/856
2007/0094596 A1 4/2007 Nielsen et al.
(Continued)

FOREIGN PATENT DOCUMENTS

CN 101401402 A 4/2009
CN 101571785 A 11/2009
(Continued)

OTHER PUBLICATIONS

Barry Schwartz; "iPhone's Spotlight Search" XP-02688918; Jun. 22, 2009 pp. 1-7.
(Continued)

*Primary Examiner* — Marcos Batista
(74) *Attorney, Agent, or Firm* — Birch, Stewart, Kolasch & Birch, LLP

(57) ABSTRACT

A mobile terminal and a touchscreen and a method of controlling the mobile terminal may be provided. The mobile terminal may cause the touchscreen to display a first item; cause the touchscreen to display a first indicator on at least part area of the first item upon receiving a first input of the first item; and cause the touchscreen to display a second item upon receiving a second input of the first indicator. Furthermore, the first item can be changed into the second item by expanding the first item. Additionally, the first item and the second item indicate items for executing a specific application. The second item has a bigger size than a size of the first item, and the second item displays first information associated with execution results of the specific application.

11 Claims, 32 Drawing Sheets

(51) Int. Cl.
*H04M 1/725* (2006.01)
*G06F 3/0481* (2013.01)
*G06F 3/0488* (2013.01)
*G06F 3/0484* (2013.01)

(52) U.S. Cl.
CPC .... *G06F 3/04883* (2013.01); *H04M 1/72544* (2013.01); *H04M 2250/22* (2013.01)

(58) Field of Classification Search
USPC .......................... 455/566; 370/338; 715/841
See application file for complete search history.

(56) References Cited

U.S. PATENT DOCUMENTS

| | | | |
|---|---|---|---|
| 2010/0262928 A1* | 10/2010 | Abbott | G06F 3/04817 715/769 |
| 2011/0167380 A1 | 7/2011 | Stallings et al. | |
| 2014/0149879 A1 | 5/2014 | Lim et al. | |

FOREIGN PATENT DOCUMENTS

| | | |
|---|---|---|
| CN | 101571786 A | 11/2009 |
| CN | 101795322 A | 8/2010 |
| JP | 2010-097353 A | 4/2010 |
| KR | 2003-0083896 A | 11/2003 |
| KR | 10-2008-0070683 A | 7/2008 |
| KR | 10-2008-0097789 A | 11/2008 |
| KR | 10-2010-0002423 A | 1/2010 |

OTHER PUBLICATIONS

Chinese Office Action issued in a corresponding Application No. 201110285154.6 dated Aug. 22, 2014.

Dan Flakes; "Hands on with iPhone 3.0's Spotlight"; Macworld; Jun. 17, 2009.

European Search Report dated Dec. 21, 2012 for Application 11006954.9.

* cited by examiner

FIG. 10
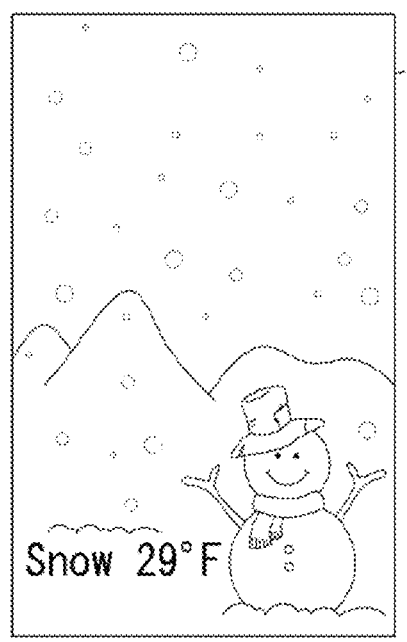
(S701)
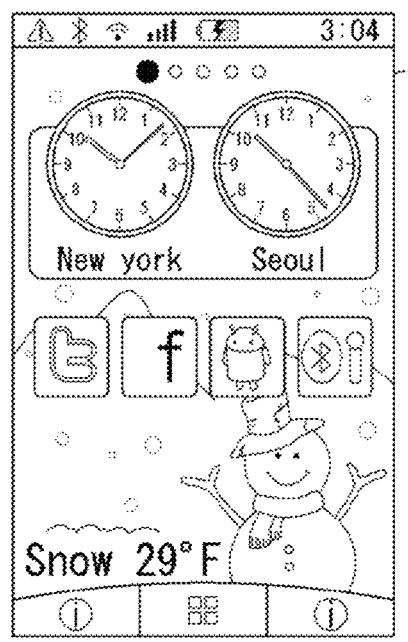
(S702)

FIG. 11
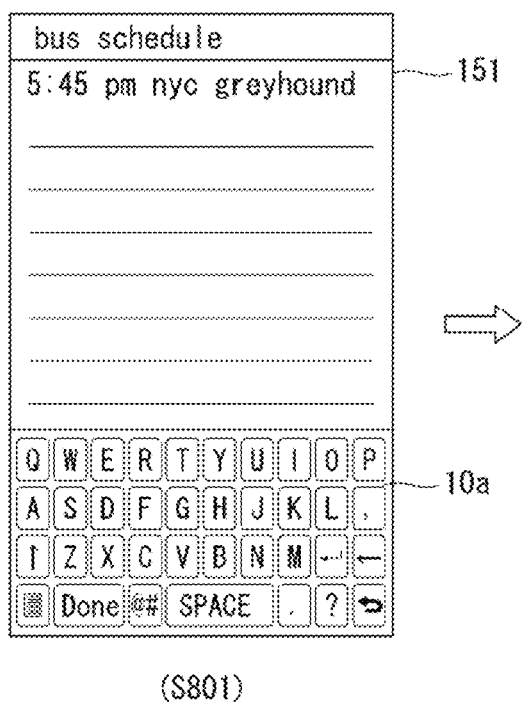
(S801)
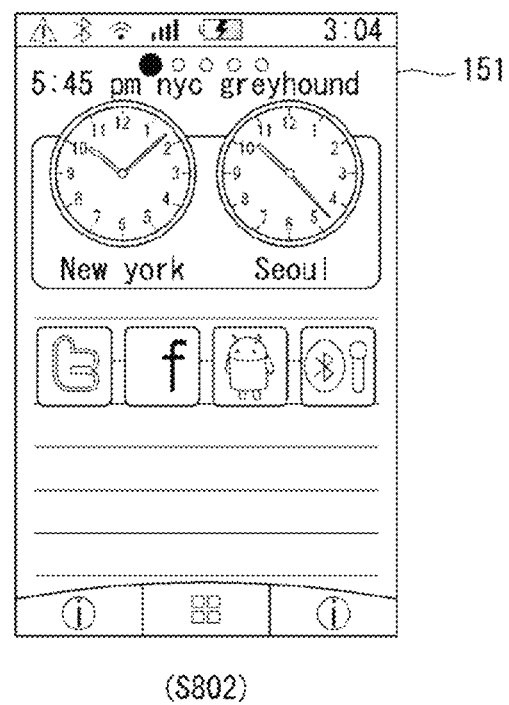
(S802)

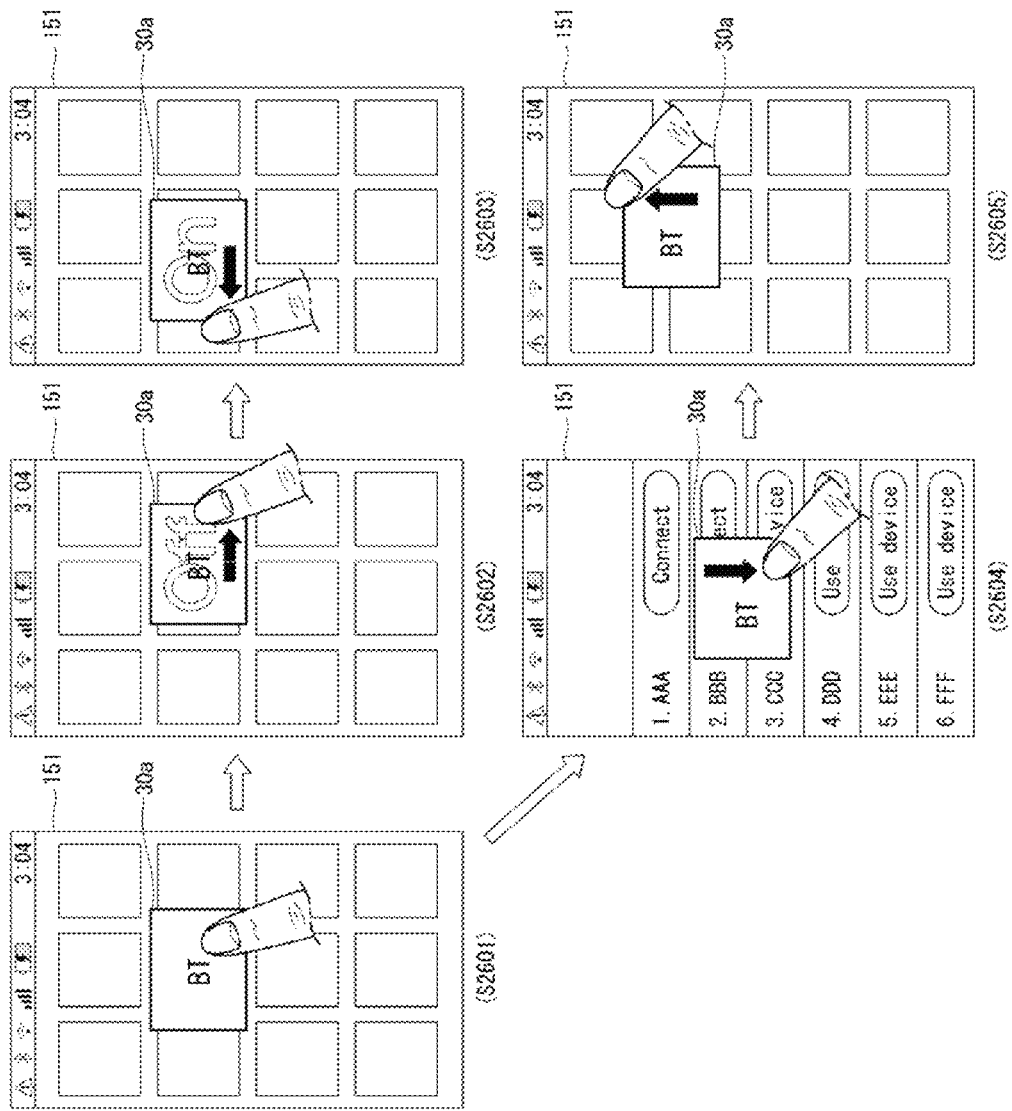

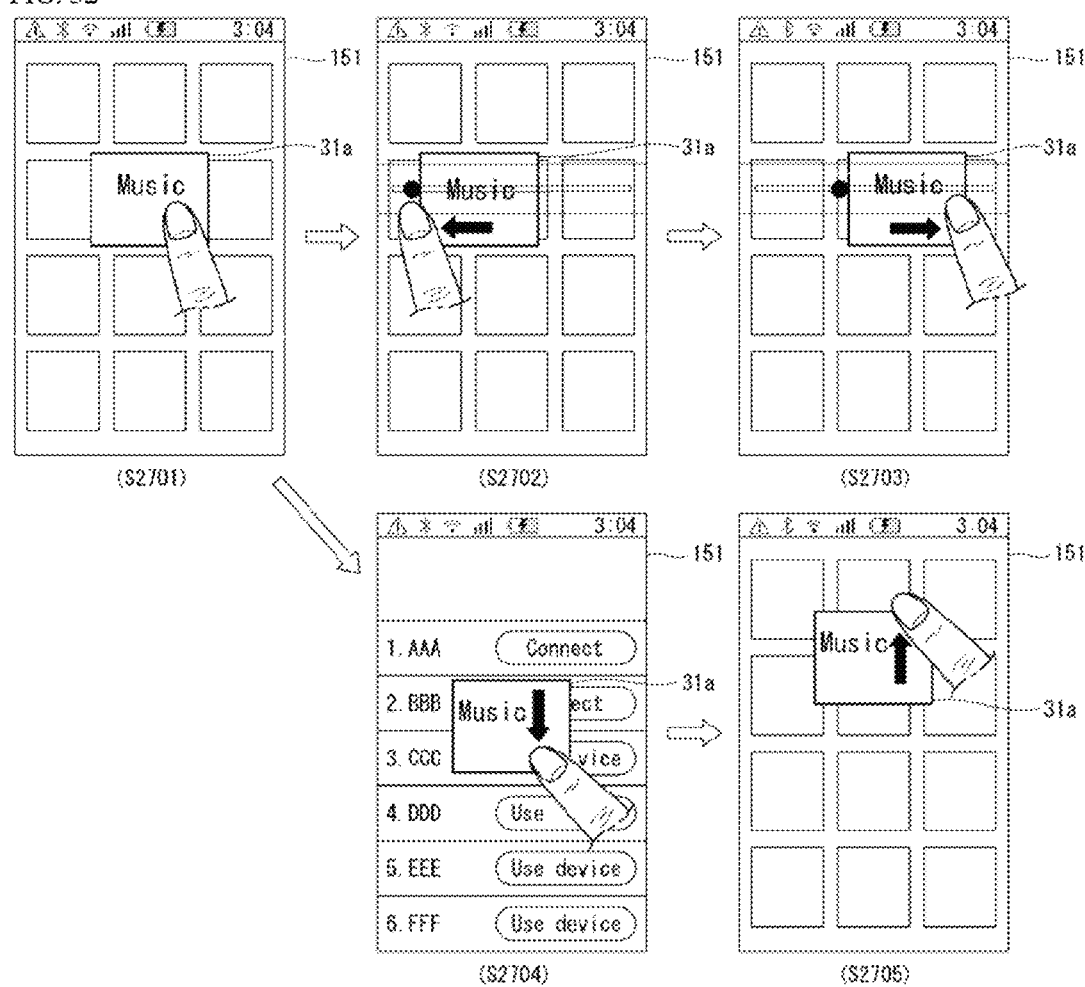

MOBILE TERMINAL AND CONTROL METHOD THEREOF

CROSS-REFERENCE TO RELATED APPLICATIONS

This application is a continuation of co-pending U.S. patent application Ser. No. 13/225,730 filed on Sep. 6, 2011, which claims priority to Korean Patent Application No. 10-2010-0091718, filed Sep. 17, 2010 and Korean Patent Application No. 10-2010-0091720, filed Sep. 17, 2010. The entire contents of all of the above applications are hereby incorporated by reference.

BACKGROUND

1. Field

Embodiments may relate to a mobile terminal and a control method thereof.

2. Background

Terminals may be classified as mobile terminals and stationary terminals. The mobile terminals may be classified into handheld terminals or vehicle mount terminals based on whether users can personally carry the terminals.

As various types of services are provided by mobile terminals, improvements in structure and/or software of the mobile terminals are being considered.

BRIEF DESCRIPTION OF THE DRAWINGS

Arrangements and embodiments may be described in detail with reference to the following drawings in which like reference numerals refer to like elements and wherein:

FIGS. 10 and 11 show an example of entering into a home screen while an application is executed in a mobile terminal according to an embodiment;

FIGS. 31 and 32 show examples of executing a function associated with an item in a quick execution mode in a mobile terminal according to an embodiment.

DETAILED DESCRIPTION

Embodiments may be described with reference to the accompanying drawings, in which exemplary embodiments are shown. Embodiments may, however, be embodied in many different forms and should not be construed as being limited to the embodiments set forth herein; rather, embodiments may be provided so that this disclosure will be thorough and complete, and will fully convey the concept of the embodiments to those skilled in the art. In the following description, suffixes "module" and "unit" are given to components of the mobile terminal in consideration of only facilitation of description and do not have meanings or functions discriminated from each other.

A mobile terminal may include a cellular phone, a smart phone, a laptop computer, a digital broadcasting terminal, a personal digital assistant (PDA), a portable multimedia player (PMP), and a navigation system, for example. However, those skilled in the art will easily understand that configurations according to embodiments may also be applied to stationary terminals such as digital TVs and desktop computers except an example where configurations can be applied to only mobile terminals.

Figure 1:
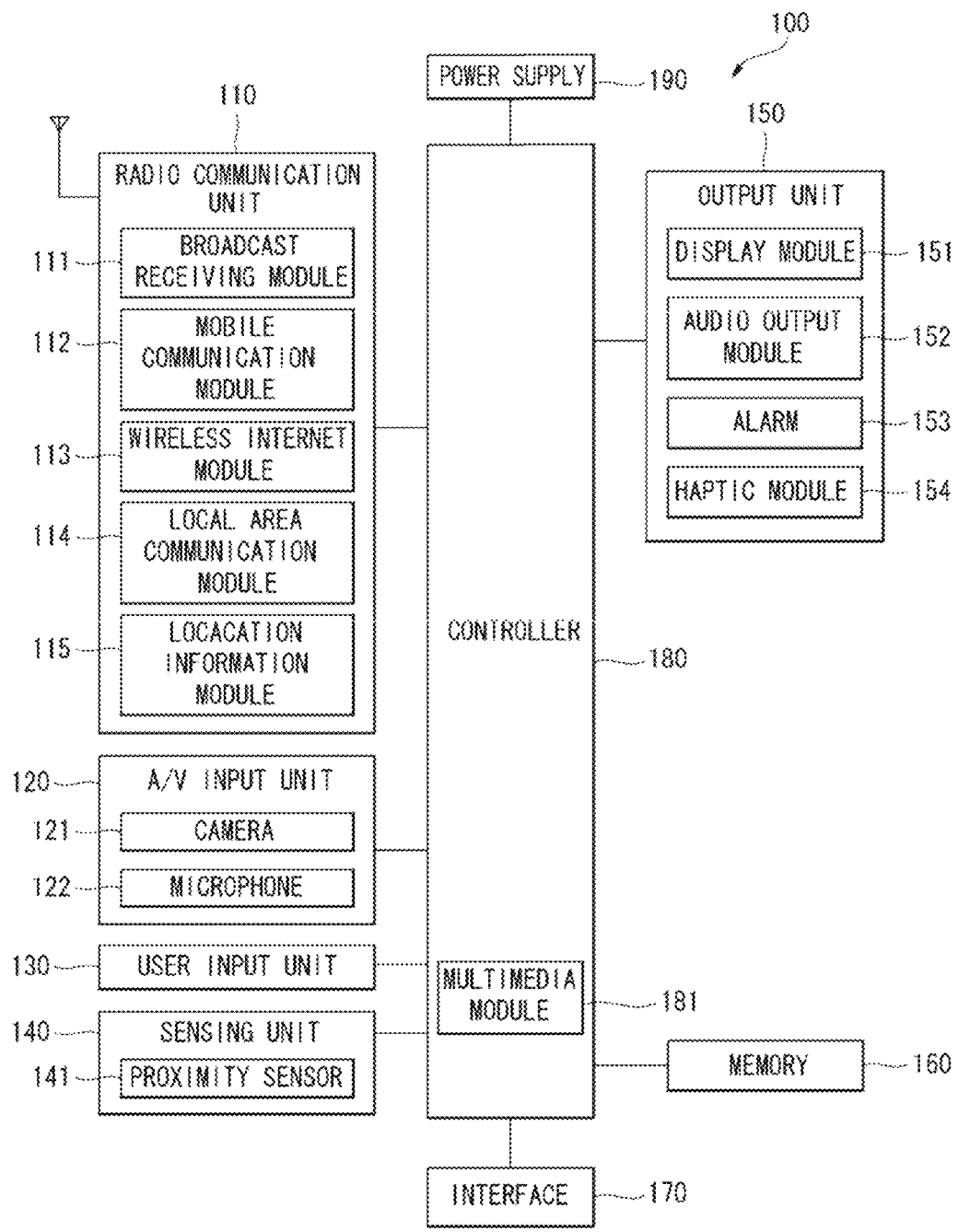
FIG. 1 is a block diagram of a mobile terminal according to an example embodiment.

FIG. 1 is a block diagram of a mobile terminal according to an example embodiment. Other embodiments, configurations and arrangements may also be provided. As shown, a mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and a number of components included in the mobile terminal 100 may vary. The components of the mobile terminal 100 may now be described.

The radio communication unit 110 may include at least one module that enables communication between the mobile terminal 100 and a communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115 (or location information module).

The broadcasting receiving module 111 may receive broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information, or the broadcasting management server may be a server that receives previously created broadcasting signals and/or broadcasting related information and transmits the broadcasting signals and/or broadcasting related information to the mobile terminal. The broadcasting signals can include not only TV broadcasting signals, radio broadcasting signals and data broadcasting signals, but also signals in the form of a combination of a TV broadcasting signal and a radio broadcasting signal.

The broadcasting related information can be information on a broadcasting channel, a broadcasting program or a broadcasting service provider. The broadcasting related information can be provided even through a mobile communication network. The broadcasting related information can be received by the mobile communication module 112.

The broadcasting related information can exist in various forms. For example, the broadcasting related information can exist in the form of an electronic program guide (EPG) of digital multimedia broadcasting (DMB) or in the form of an electronic service guide (ESG) of digital video broadcast-handheld (DVB-H).

The broadcasting receiving module 111 may receive broadcasting signals using various broadcasting systems. More particularly, the broadcasting receiving module 111 may receive digital broadcasting signals using digital broadcasting systems such as digital multimedia broadcasting-terrestrial (DMB-T), digital multimedia broadcasting-satellite (DMB-S), media forward link only (MediaFLO), DVB-H and/or integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external device and/or a server on a mobile communication network. The radio signal can include a voice call signal, a video telephony call signal or data in various forms based on transmission and receiving of text/multimedia messages.

The wireless Internet module 113 may be a module for wireless Internet access and may be included in the mobile terminal 100 or may be externally attached to the mobile terminal 100. Wireless LAN (WLAN) (Wi-Fi), wireless broadband (Wibro), world interoperability for microwave access (Wimax), high speed downlink packet access (HSDPA) and/or so on can be used as a wireless Internet technique.

The local area communication module 114 may be a module for local area communication. Bluetooth, radio frequency identification (RFID), infrared data association (IrDA), ultra wideband (UWB) and/or ZigBee may be used as a local area communication technique.

The position information module 115 may confirm or obtain a position (or location) of the mobile terminal 100. A global positioning system (GPS) module is a representative example of the position information module 115. The GPS module may calculate information on distances between one point (object) and at least three satellites and information on a time when the distance information is measured and apply trigonometry to the obtained distance information to obtain three-dimensional position information on the point (object) based on latitude, longitude and altitude at a predetermined time. Further, a method of calculating position and time information using three satellites and correcting the calculated position and time information using another satellite may also be used. Additionally, the GPS module may continuously calculate the current position in real time and calculate velocity information using the position information.

Referring to FIG. 1, the A/V input unit 120 may input an audio signal or a video signal and may include a camera 121 and a microphone 122. The camera 121 may process image frames of still images and/or moving images obtained by an image sensor in a video telephony mode or a photographing mode. The processed image frames may be displayed on a display 151 (or display module).

The image frames processed by the camera 121 may be stored in the memory 160 or may be transmitted to an external device through the communication unit 110. The mobile terminal 100 can include at least two cameras according to constitution of the mobile terminal 100.

The microphone 122 may receive an external audio signal in a call mode, a recording mode or a speed recognition mode, and the microphone 122 may process the received audio signal into electric audio data. The audio data can be converted into a form that can be transmitted to a mobile communication base station through the mobile communication module 112 and output in the call mode. The microphone 122 can employ various noise removal algorithms for removing noise (or canceling noise) generated when the external audio signal is received.

The user input unit 130 may receive input data for controlling an operation (or operations) of the mobile terminal 100 from a user. The user input unit 130 can include a keypad, a dome switch, a touch pad (constant voltage/capacitance), jog wheel, jog switch and/or so on.

The sensing unit 140 may sense a current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100, and the sensing unit 140 may generate a sensing signal for controlling the operation of the mobile terminal 100. For example, the sensing unit 140 can sense whether a slide phone is opened or closed when the mobile terminal 100 is the slide phone. Further, the sensing unit 140 can sense whether the power supply 190 supplies power and whether the interface 170 is connected to an external device. The sensing unit 140 may include a proximity sensor 141.

The output unit 150 may generate visual, auditory and/or tactile output and can include the display 151, an audio output module 152, an alarm 153 and a haptic module 154.

The display 151 may display information processed by the mobile terminal 100. For example, the display 151 may display UI or graphic user interface (GUI) related to a telephone call when the mobile terminal is in the call mode. The display 151 may display a captured and/or received image, UI or GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display.

The display may be of a transparent type or a light transmission type. This may be referred to as a transparent display. The transparent display may include a transparent liquid crystal display. The rear structure of the display 151 can also be of the light transmission type. According to this structure, a user can see an object located behind the body of the mobile terminal 100 through an area of the body of the mobile terminal 100, which is occupied by the display 151.

The mobile terminal 100 may include at least two displays 151 according to constitution of the mobile terminal 100. For example, the mobile terminal 100 may include a plurality of displays that are arranged on a single face at a predetermined distance or may be integrated. Otherwise, the plurality of displays can be arranged on different sides.

In an example where the display 151 and a sensor sensing touch (hereafter referred to as a touch sensor) form a layered structure, which may be referred to as a touch screen, the display 151 can be used as an input device in addition to an output device. The touch sensor can be in the form of a touch film, a touch sheet and/or a touch pad, for example.

The touch sensor can be constructed such that the touch sensor converts a variation in pressure applied to a specific portion of the display 151 or a variation in capacitance generated at a specific portion of the display 151 into an electric input signal. The touch sensor can be constructed such that the touch sensor can sense pressure of touch as well as position and area of touch.

When a touch input is applied to the touch sensor, a signal corresponding to the touch input is transmitted to a touch controller. The touch controller may process the signal and transmit data corresponding to the processed signal to the controller 180. Accordingly, the controller 180 can detect a touched portion of the display 151.

The proximity sensor 141 can be located in an internal region of the mobile terminal, surrounded by the touch screen, or near the touch screen. The proximity sensor 141 may sense an object approaching a predetermined sensing face or an object located near the proximity sensor 141 using an electromagnetic force or infrared rays without having a mechanical contact. The proximity sensor 141 may have a lifetime longer than that of a contact sensor, and the proximity sensor 141 may have a wide application.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, and/or etc.

A capacitive touch screen is constructed such that proximity of a pointer is detected through a variation in an electric field based on the proximity of the pointer. In this example, the touch screen (touch sensor) can be classified as a proximity sensor.

For ease of explanation, an action of approaching the pointer to the touch screen while the pointer is not in contact with the touch screen such that location of the pointer on the touch screen is recognized may be referred to as a "proximity touch" and an action of bring the pointer into contact with the touch screen may be referred to as a "contact touch". A proximity touch point of the pointer on the touch screen may mean a point of the touch screen to which the pointer corresponds substantially perpendicularly to the touch screen when the pointer proximity-touches the touch screen.

The proximity sensor may sense a proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and the proximity touch pattern can be displayed on the touch screen.

The audio output module 152 may output audio data received from the communication unit 110 or stored in the memory 160 in a call signal receiving mode, a telephone call mode or a recording mode, a speech recognition mode and a broadcasting receiving mode. The audio output module 152 may output audio signals related to functions (e.g., a call signal incoming tone, a message incoming tone, etc.) performed in the mobile terminal 100. The audio output module 152 can include a receiver, a speaker, a buzzer, etc.

The alarm 153 may output a signal for indicating generation of an event of the mobile terminal 100. Examples of events generated in the mobile terminal 100 may include receiving of a call signal, receiving of a message, input of a key signal, input of touch, and/or etc. The alarm 153 can output signals in forms different from video signals or audio signals, for example, a signal for indicating generation of an event through vibration. The video signals or the audio signals can be also output through the display 151 or the audio output module 152.

The haptic module 154 may generate various haptic effects that the user can feel. A representative example of the haptic effects is vibration. An intensity and a pattern of vibration generated by the haptic module 154 may be controlled. For example, different vibrations can be combined and output and/or may be sequentially output.

The haptic module 154 can generate a variety of haptic effects including an effect of stimulus based on arrangement of pins vertically moving for a contact skin face, an effect of stimulus based on jet force or sucking force of air through a jet hole or a sucking hole, an effect of stimulus rubbing the skin, an effect of stimulus based on contact of an electrode, an effect of stimulus using electrostatic force and an effect based on reproduction of cold and warmth using an element capable of absorbing or radiating heat in addition to vibrations.

The haptic module 154 may not only transmit haptic effects through direct contact but also allow the user to feel haptic effects through kinesthetic sense of his fingers or arms. The mobile terminal 100 can include at least two haptic modules 154 according to constitution of the mobile terminal 100.

The memory 160 can store a program for operation of the controller 180 and may temporarily store input/output data (e.g., phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for e.g., SD or XD memory), a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 can operate in relation to a web storage performing a storing function of the memory 160 on the Internet.

The interface 170 may serve as a path to all external devices connected to the mobile terminal 100. The interface 170 may receive data from the external devices or power and transmit the data or power to internal components of the mobile terminal 100 or transmit data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, and/or etc., for example.

An identification module is a chip that stores information for authenticating authority to use the mobile terminal 100 and can include a user identify module (UIM), a subscriber identify module (SIM) and/or a universal subscriber identify module (USIM). A device (hereafter referred to as an identification device) including the identification module can be manufactured in the form of a smart card. Accordingly, the identification device can be connected to the mobile terminal 100 through a port.

The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 may control the overall operation of the mobile terminal. For example, the controller 180 may perform control and processing for voice communication, data communication and video telephony. The controller 180 can include a multimedia module 181 for playing multimedia. The multimedia module 181 can be included in the controller 180 or may be separated from the controller 180.

The controller 180 can perform a pattern recognition process capable of recognizing handwriting input or picture-drawing input applied to the touch screen as characters or images.

The power supply 190 may receive external power and internal power and provide power required for operations of components of the mobile terminal under control of the controller 180.

Various embodiments may be implemented in a computer or similar device readable recording medium using software, hardware and/or a combination thereof, for example.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. In some cases, embodiments may be implemented by the controller 180.

According to software implementation, embodiments such as procedures or functions may be implemented with a separate software module that executes at least one function or operation. Software codes can be implemented according to a software application written in an appropriate software language. Further, the software codes can be stored in the memory 160 and executed by the controller 180.

Figure 2:
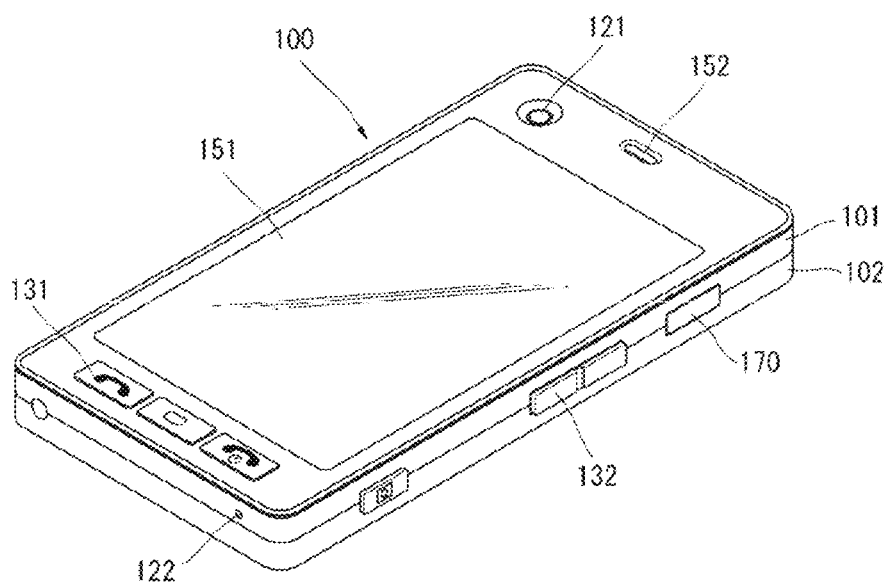
FIGS. 2 and 3 are perspective views of a mobile terminal according to an embodiment.

FIG. 2 is a perspective view of a mobile terminal as viewed from a front side according to an embodiment.

Referring to FIG. 2, the mobile terminal 100 may be implemented in a bar-type. However, embodiments are not limited thereto. For example, the mobile terminal 100 may be implemented in various types, such as a sliding type, a cram shell type, a swing type, and/or a swivel type. In an example of the sliding type, the mobile terminal 100 may include two or more bodies that are slidingly movable with respect to each other.

The body of the mobile terminal 100 may include a casing that may have a housing cover. The case may include a front casing 101 and a rear casing 102. Various electronic parts may be embedded in a space between the front casing 101 and the rear casing 102. At least one intervening casing may be positioned between the front casing 101 and the rear casing 102.

The casing may be formed by injection molding of plastics and/or may be formed of a metal such as stainless steel (STS) or titanium (Ti).

The display 151, the audio output module 152, the camera 121, the user input unit 130 (including a first user input unit 131 and a second user input unit 132), the microphone 122, and the interface 170 may be arranged on the front casing 101 of the mobile terminal 100.

The display 151 may occupy most of the main face of the front casing 101. The audio output module 152 and the camera 121 may be provided at an area adjacent to one of both end portions of the display 151, while the first user input unit 131 and the microphone 122 are provided at an area adjacent to the other one of both end portions of the display 151. The second user input unit 132 and the interface 170 may be provided on the lateral sides of the front and rear casings 101 and 102.

The user input unit 130 may receive commands for controlling operations of the mobile terminal 100. The user input unit 130 may include a plurality of the manipulating units 131 and 132.

The manipulating units 131 and 132 may also be generally called a manipulating portion, and they may adopt a mechanism of a tactile manner that enables a user to perform a manipulation action by experiencing a tactile feeling.

The contents inputted by the manipulating units 131 and 132 may be diversely set. For example, commands, such as start, end, and scroll, may be inputted to the manipulating unit 131. A command for volume adjustment of sound outputted from the audio output unit 152 and a command for switching to a touch recognizing mode of the display 151 may be inputted to the manipulating unit 132.

Figure 3:
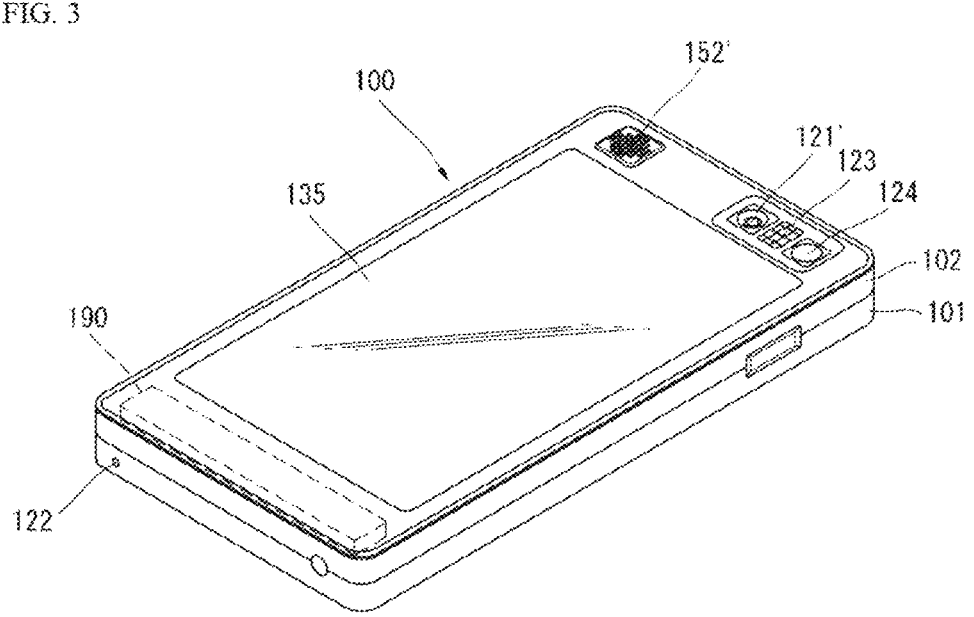

FIG. 3 is a perspective view of a rear surface of the mobile terminal shown in FIG. 2.

As shown in FIG. 3, an additional camera 121' may be provided on the rear casing 102 of the mobile terminal 100. The camera 121' may include a capturing direction substantially opposite of the camera 121 (shown in FIG. 2), and resolution of the camera 121' may be different from that of the camera 121.

For example, the camera 121 may have a low resolution that is enough to capture a user's face and send the captured image to the other party while performing a video communication. The camera 121' may have a high resolution for general purpose of image capturing. The cameras 121 and 121' may be provided in the body of the mobile terminal 100 to be rotated or popped up.

A flash 123 and a mirror 124 may be further provided adjacent to the camera 121'. The flash 123 may project light toward a subject in an example where the subject is photographed using the camera 121'. If a user attempts to take a picture of the user (self-photography) using the camera 121', the mirror 124 may enable the user to view a user's face reflected by the mirror 124.

An additional audio output unit 152' may be provided on a backside of the terminal body. The additional audio output unit 152' may implement a stereo function along with the audio output unit 152 (FIG. 2), and the additional audio output unit 152' may be used to implement a speaker phone mode in talking over the mobile terminal.

A broadcast signal receiving antenna 124 may be additionally provided at a lateral side of the terminal body as well as an antenna for communication, etc. The antenna 124 may be considered as being a portion of the broadcast receiving module 111 (FIG. 1) and may be retractably provided on the terminal body.

The power supply 190 for supplying power to the mobile terminal 100 may be mounted on the terminal body. The power supply 190 may be built within the terminal body. Alternatively, the power supply 190 may be detachably connected to the terminal body.

A touchpad 135 for detecting a touch may be further provided on the rear casing 102. The touchpad 135 may be configured in a light-transmittive type like the display 151. If the display 151 is configured to output visual information from both faces, the visual information may be recognized through the touchpad 135 as well. Information outputted from both faces may be controlled by the touchpad 135. Alternatively, an additional display may be provided to the touchpad 135 so that a touch screen is also provided to the rear casing 102.

The touch pad 135 may be activated in conjunction with the display 151 of the front casing 101. The touchpad 135 may be provided in rear of the display 151 in parallel to one another. The size of the touchpad 135 may be equal to or less than that of the display 151.

The exemplary embodiments disclosed herein may be implemented in the mobile terminal 100 described in connection with FIGS. 1 to 3.

A method of controlling the mobile terminal 100 and an operation of the mobile terminal 100 according to an embodiment may be described with reference to FIGS. 4 to 8.

A "shortcut icon" may be an icon that serves as a medium for directly executing an application or content. The shortcut icon may include location information on the corresponding application or content. When the shortcut icon is selected, the corresponding application or content may be executed. A "widget" may refer to a small window for operating the corresponding application and dynamically displaying the executed result of the application. The widget may also function as a shortcut to the corresponding application or content like the shortcut icon. For example, when a widget is selected, the mobile terminal 100 may execute the corresponding application or content. However, unlike the shortcut icon, the widget may dynamically display an executed result of the application. A "group icon" may be an icon that represents an icon group including a plurality of shortcut icons or widgets. When the group icon is selected, the mobile terminal 100 may display a list of shortcut icons or widgets included in the corresponding group.

The home screen may include a plurality of pages that each may be represented by a page indicator. The display screen may display a single page at a time.

Figure 4:
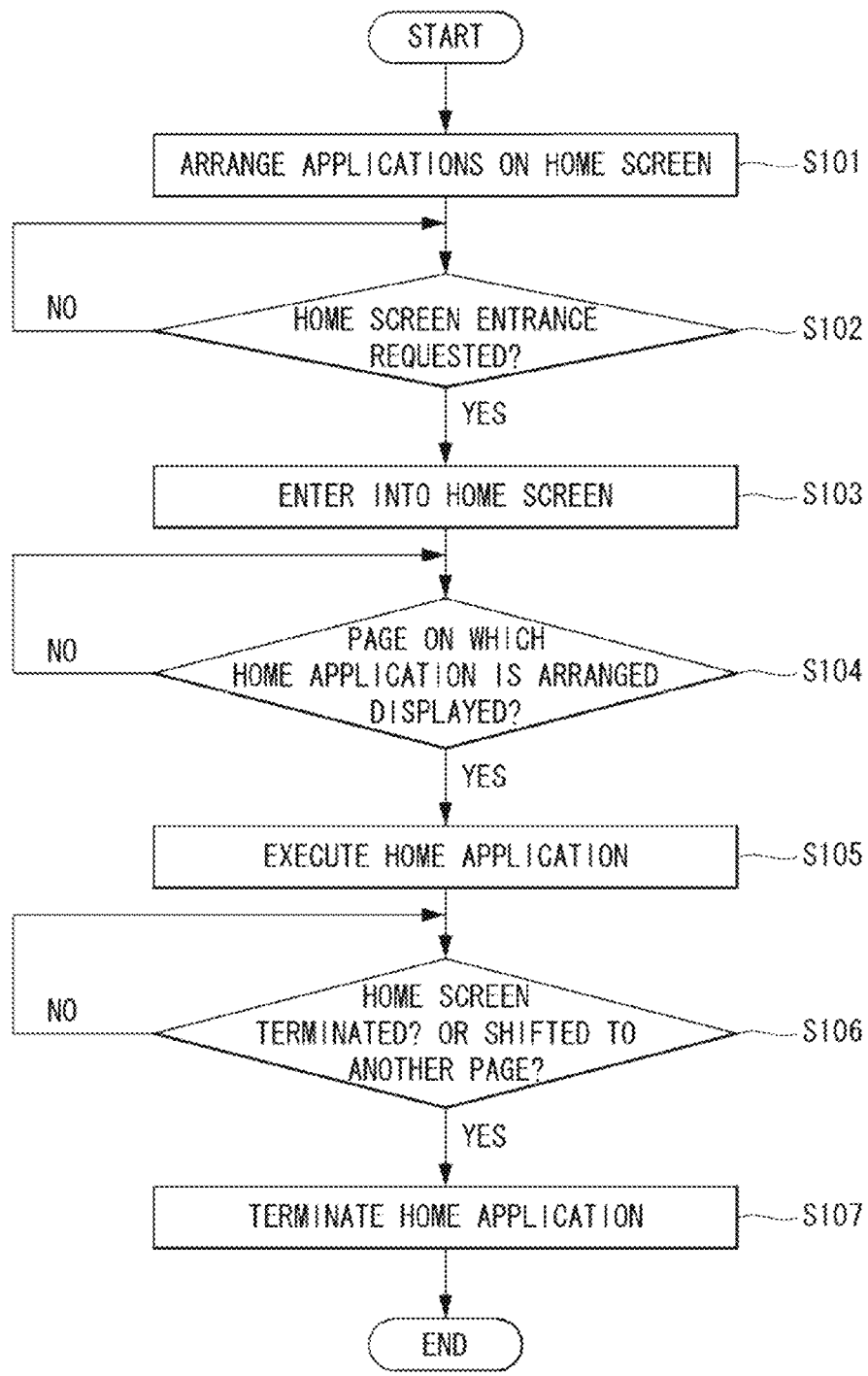
FIG. 4 is a flowchart of a method of controlling a mobile terminal according to an embodiment.

FIG. 4 is a flowchart of a method of controlling a mobile terminal according to an embodiment. FIGS. 4 to 7 are views illustrating a method of controlling the mobile terminal 100 according to an embodiment. Other embodiments and configurations may be provided.

As shown in FIG. 4, the controller 180 may arrange or provide an application (or applications) on at least one page included in a home screen (S101). When the application is arranged on a specific page in the home screen, the controller 180 may execute the application when moving to the corresponding page. Further, the controller 180 may display an execution image of the application on the home screen of the mobile terminal 100. For this, the controller 180 may map the page in the home screen on which the application is arranged with the application and store the mapped result in the memory 160. That is, information on what application is arranged in the corresponding page is stored in the memory 160.

Figure 5:
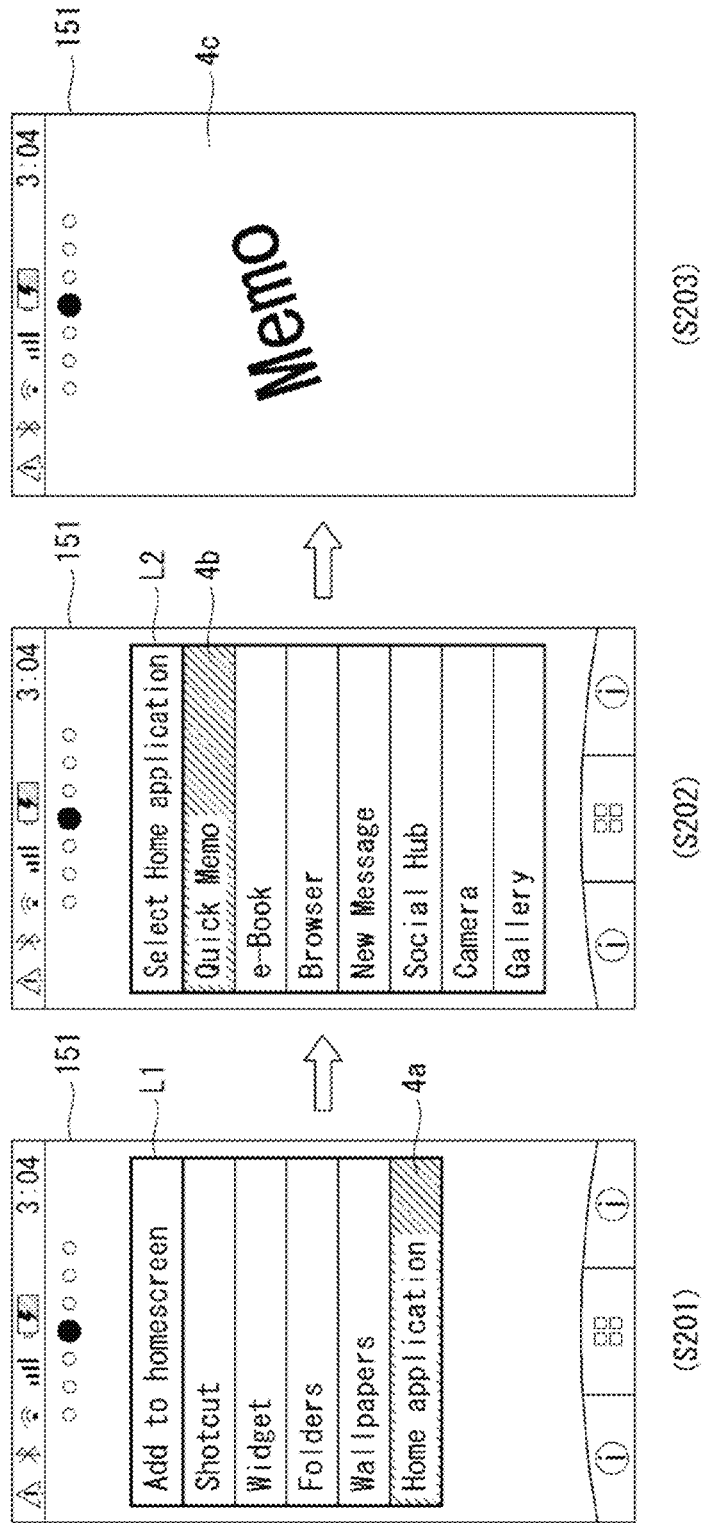
FIGS. 5 and 6 shows examples of arranging applications on a home screen of a mobile terminal according to an embodiment.

FIGS. 4 and 5 illustrate arranging applications on a home screen. Other examples may also be provided.

As shown in FIG. 5, the controller 180 may display a list L1 of items addable to the home screen on the display 151 based on a control input received from the user input unit 130 or the touch screen (of the display 151) (S201). The items addable on the home screen may include shortcut icons, widgets, folders, wallpapers, and/or home applications. The folder may refer to a group icon and the home application may refer to an application installed in the home screen. When a home application 4a is selected from the list L1, the controller 180 may display a list L2 of addable home applications on the touch screen (of the display 151) (S202). When an application 4b is selected from the home application list L2, the controller 180 may arrange or provide the selected application 4b on the home screen (S203). According to an embodiment, the controller 180 may display the home application 4b requested to be arranged or provided on a page of the home screen displayed on the current screen. For example, when page 4 of the home screen displayed on the current touch screen (of the display 151) is a fourth page and the home application selected from the home application list L2 is a memo application, the controller 180 may install the memo application in the fourth page of the home screen. Further, the controller 180 may arrange or provide the home application 4b on a page other than the page displayed on a current screen. The controller 180 may add a new page to the home screen and may arrange or provide the selected home application on the newly added page. For example, when the home screen includes seven pages and a request is received to provide the memo application on the home screen, the controller 180 may add an eighth page to the home screen and may provide the memo application on the eighth page.

An execution image 4c of the home application provided on the home screen may be displayed on an entire area or a partial area of the page on which the corresponding application is arranged. When the execution image 4c is displayed on a partial area of the page, the controller 180 may downsize the execution image of the home application. Further, the execution image may be displayed as a background image of the page on which the application is arranged. For example, when the memo application is arranged on the fourth page of the home screen, the controller 180 may display the execution image 4c of the memo application on the entire area of the fourth page of the home screen.

Figure 6:
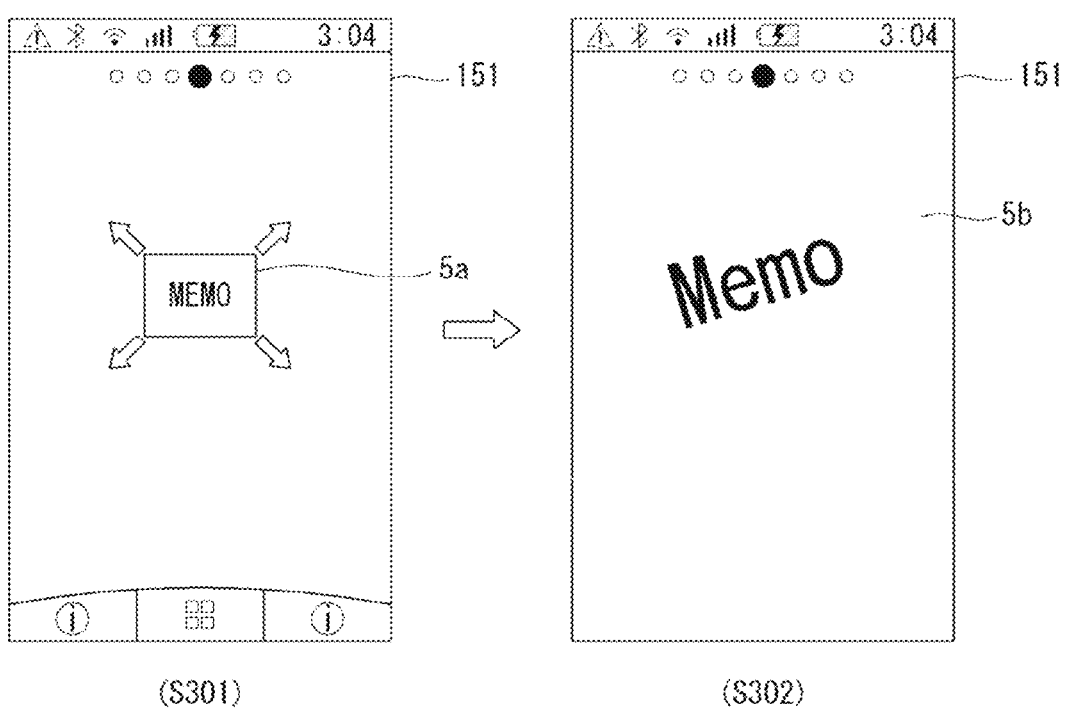

As shown in FIG. 6, the controller 180 may enter into a mode for changing a display size of an item 5a (hereafter referred to as a display size changing mode) provided on the home screen based on user's control input through the touch screen or the user input unit 130 (S301). For example, when the item 5a displayed on the screen is touched for a predetermined time, the controller 180 may enter into the mode for changing the display size of the item 5a. The controller 180 may enter into the mode for changing the display size of the item 5a when the item 5a is multi-touched. After entering into the display size changing mode, the controller 180 may change the size of the item 5a based on a received drag input. As the size of the item 5a is changed, the item 5a may change in shape into a shortcut icon, a widget and/or a home application. When the display size of the item 5a increases by more than a predetermined size, the controller 180 may transform the item 5a to a home application 5b and provide the home application 5b on the home screen (S302). The executing home application 5b on the home screen may be displayed on an entire area or on a partial area of the page on which the corresponding application is arranged. The executing home application may be displayed as a background image of the page on which the corresponding application is arranged.

Returning to FIG. 4, when an entrance into the home screen is requested while the application is in execution (S102), the controller 180 may pause or terminate the executing application and enter into the home screen (S103). The controller 180 may display any one page constituting the home screen on the screen of the mobile terminal 100 through the display 151. Thereafter, the page of the home screen displayed on the screen may be shifted based on a control input received through the user input unit 130 or the touch screen (of the display 151).

When the page on which the home application is provided is displayed on the screen while entering into the home screen or shifting the page of the home screen, the controller 180 may execute the home application provided on the corresponding page (S105). The controller 180 may display an execution image of the home application on the screen of the mobile terminal 100. The execution image of the home application may be a last execution image of the corresponding application. When the application is ended, the controller 180 may store a last entrance step of the application and the execution image in the memory 160. When the corresponding application is executed again as the home application, the controller 180 may execute the application based on the last entrance step stored in the memory 160 and display the last execution image of the corresponding application stored in the memory 160. The execution image of the home application may be displayed on an entire area of the displayed page or on a partial area of the screen with a shrunk image. Further, the execution image of the home application may be displayed as a background image of the currently displayed page.

Figure 7:
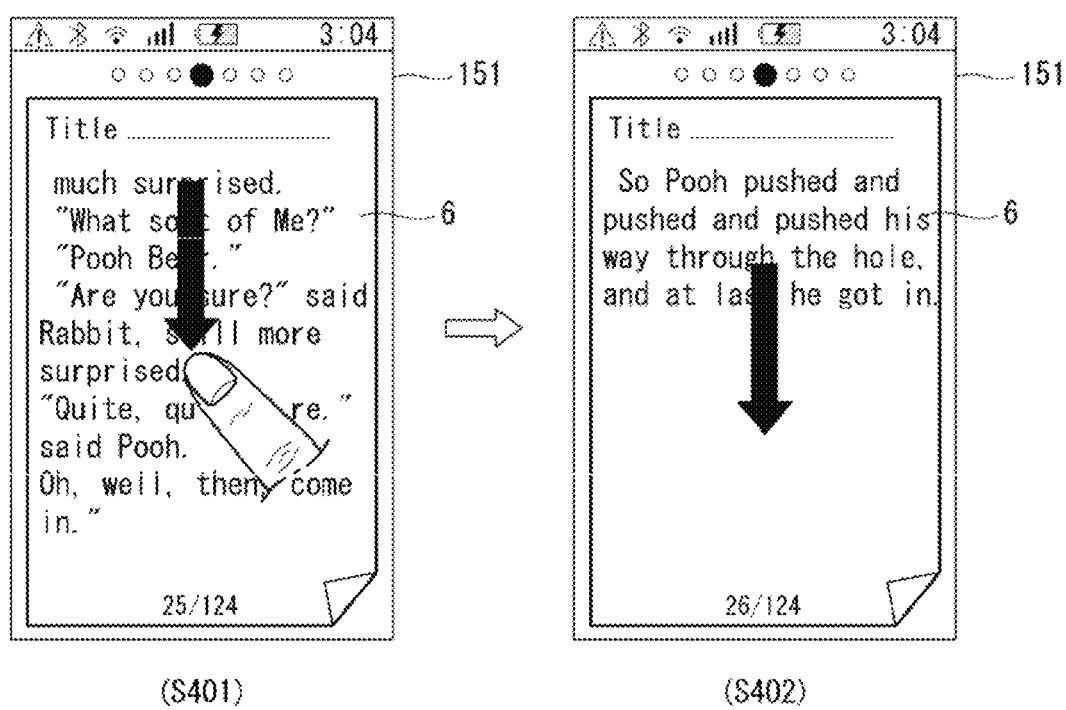
FIG. 7 shows an example of receiving a control input when a home application is executed in a mobile terminal according to an embodiment.

When the home application is executed on the home screen, the controller 180 may also receive a control input for the corresponding application. FIG. 7 shows an example of receiving a control input while executing the home application.

Referring to FIG. 7, the controller 180 may display, on a screen, a page 6 on which an e-book application is provided from among pages of the home screen. The e-book application may be executed as the home application, and an execution image of the e-book application may be displayed on the screen (S401). Upon receiving a control input for the e-book application through the user input unit 130 or the touch screen, the controller 180 may execute a function of the e-book application corresponding to the received control input (S402). For example, upon receiving a page scroll request while displaying an e-book on the screen through the e-book application, the controller 180 may scroll the page displayed on the screen.

Referring to FIG. 4, when a control input is received through the user input unit 130 or the touch screen (of the display 151) and thus the current page is changed to another page of the home screen or the home screen is terminated (S106), the controller 180 may terminate the home application in execution on the current page (S107). Further, the controller 180 may store a last entrance step of the application and an execution image displayed last before terminating the corresponding application in the memory 160. When the page of the home screen on which the corresponding application is the home application is displayed on the screen, the controller 180 may read the last entrance step of the corresponding application from the memory 160 and execute the application based on the last entrance step. The controller 180 may display the last execution image of the corresponding application read from the memory 160 on the screen of the mobile terminal 100.

Figure 8:
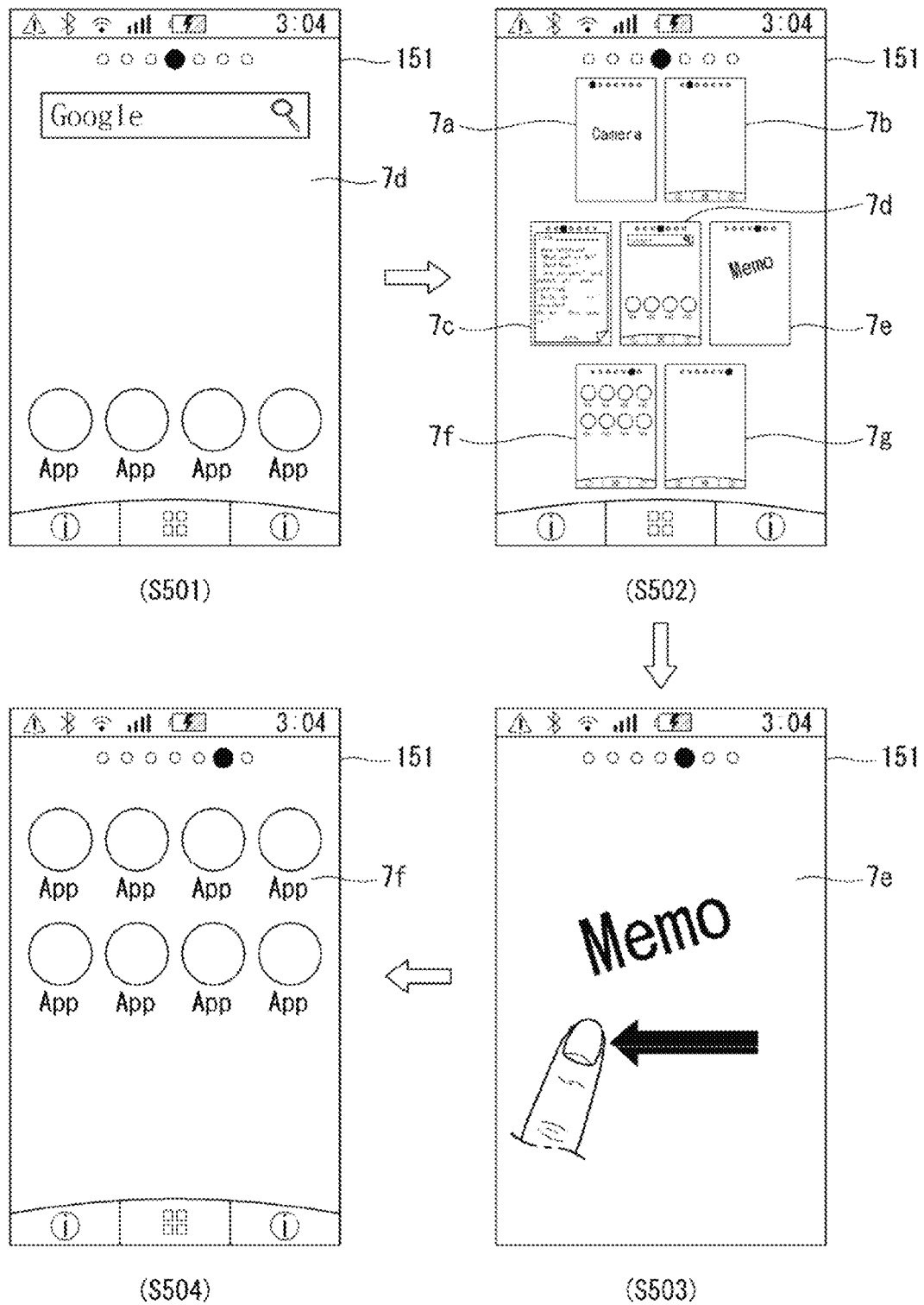
FIG. 8 shows an example of executing a home application in a mobile terminal according to an embodiment.

FIG. 8 shows an example of executing the home application in the mobile terminal 100 according to an embodiment.

Referring to FIG. 8, the controller 180 may enter into the home screen based on a received control input (S501). Accordingly, any one 7d of a plurality of pages (that constitute the home screen) may be displayed on the touch screen (of the display 151). Upon receiving a touch input while in the home screen, the controller 180 may display a list of the pages 7a, 7b, 7c, 7d, 7e, 7f, and 7g constituting the home screen on the touch screen (of the display 151) (S502). For example, when the touch screen is multi-touched while the home screen is displayed and a drag input is received starting from one of the multi-touched points, the controller 180 may display the list of the pages 7a, 7b, 7c, 7d, 7e, 7f, and 7g on the touch screen (of the display 151). Referring to FIG. 8, the list of the pages (constituting the home screen) may be displayed in a shrunken manner. When any one shrunken page image (e.g. a thumbnail of the page 7e), is selected from the list, the controller 180 may display the corresponding page 7d on the screen (S503). When the selected page 7e is the page on which the home application is provided, the controller 180 may execute the home application on the page 7e. For example, a memo application may be the home application on the selected page 7e, and the controller 180 may execute the memo application while moving to the corresponding page, and the controller 180 may display an execution image of the memo application on the page 7e. With reference to FIG. 8, when a shift to another page 7f in the home screen is requested while the home application is executed, the controller 180 may pause or terminate the executing home application. The controller 180 may move to the page 7f and display the page 7f on the screen (S504).

According to an embodiment described in connection with FIGS. 4 to 8, a user may execute or terminate an application only by entering into the home screen and moving a page without a separate manipulation for executing the application. The selecting and executing of an application that the user desires to execute in the home screen may be omitted, thereby simplifying a user's manipulation. Further, a delay that the user may feel while executing and terminating the application may be minimized.

A method of controlling the mobile terminal 100 and an operation of the mobile terminal 100 according to an embodiment may be described with reference to FIGS. 9 to 13.

Figure 9:
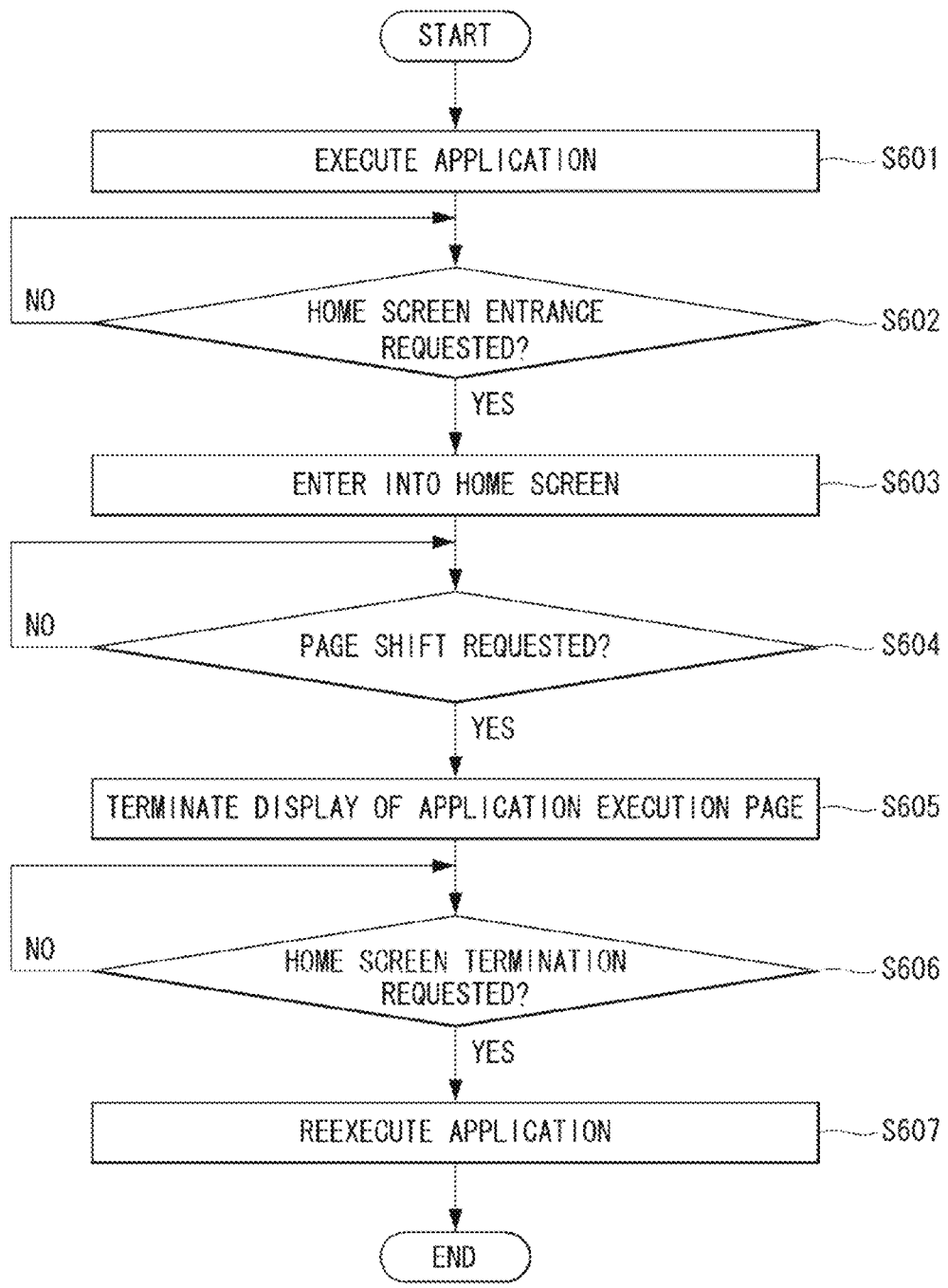
FIG. 9 is a flowchart of a method of controlling a mobile terminal according to an embodiment.

FIG. 9 is a flowchart of a method of controlling the mobile terminal 100 according to an embodiment. FIGS. 10 to 13 show a method of controlling the mobile terminal 100 according to an embodiment. Other embodiments and configurations may also be provided.

Referring to FIG. 9, the controller 180 may execute an application (S601). When an entrance into the home screen is requested through the user input unit 130 or the touch screen (of the display 151) while the application is executing (S602), the controller 180 may pause or terminate the executing application and enter into the home screen (S603).

Upon terminating the application, the controller 180 may store, in the memory 160, a last entrance operation of the application or an execution image displayed last on the screen. This may correspond to a last status of the application. As the home screen is executed, the controller 180 may display the last execution image (or last status) of the application as a background image of the home screen and may display items arranged on the home screen on the background image in an overlapping manner. Accordingly, a user may identify the items arranged on the home screen while the execution image of the executing application is displayed on the screen.

FIGS. 10 and 11 show an example of entering into a home screen while in execution of an application.

Referring to FIG. 10, when an entrance into the home screen is requested while a weather application is ongoing (S701), the controller 180 may pause or terminate the weather application. The controller 180 may enter into the home screen and display any one of the pages included in the home screen on the screen (S702). While pausing or terminating the weather application to enter into the home screen, the controller 180 may store a last execution image of the weather application in the memory 160 and display the last execution image as a background image of the home screen upon entering into the home screen.

Referring to FIG. 11, the controller 180 may execute a memo application and display a key pad 10a for entry of a memo on the screen (S801). When an entrance into the home screen is requested while the key pad 10a is displayed on the screen, the controller 180 may pause or terminate the memo application. The controller 180 may enter into the home screen and display any one of the pages included in the home screen on the screen (S802). While pausing or terminating the memo application to enter into the home screen, the controller 180 may store a last execution image (or last status) of the memo application in the memory 160 and display the stored last execution image upon entering into the home screen. When the entrance into the home screen is requested while the key pad 10a is displayed, the controller 180 may store not the execution image of the key pad 10a but rather the execution image of the memo application prior to display of the key pad 10a as the last background image in the memory 160. For example, when the application is terminated for entrance into the home screen while the key pad 10a is being displayed, the controller 180 may store, in the memory 160, an execution image (or last status) in which the key pad 10a is displayed in an inactivated manner as the last execution image of the corresponding application.

Returning to FIG. 9, when a page shift in the home screen is requested through the user input unit 130 or the touch screen (of the display 151) after entrance into the home screen (S604), the controller 180 may terminate the display of the execution image of the application. For example, when shifting (or changing) to another page in the home screen, the controller 180 may change the background image from the application execution image to the background image as originally set (S605). The execution image of the application in execution right before entering into the home screen may be displayed as the background image of the home screen only during a time after entering into the home screen and before a page shift takes place.

Figure 12:
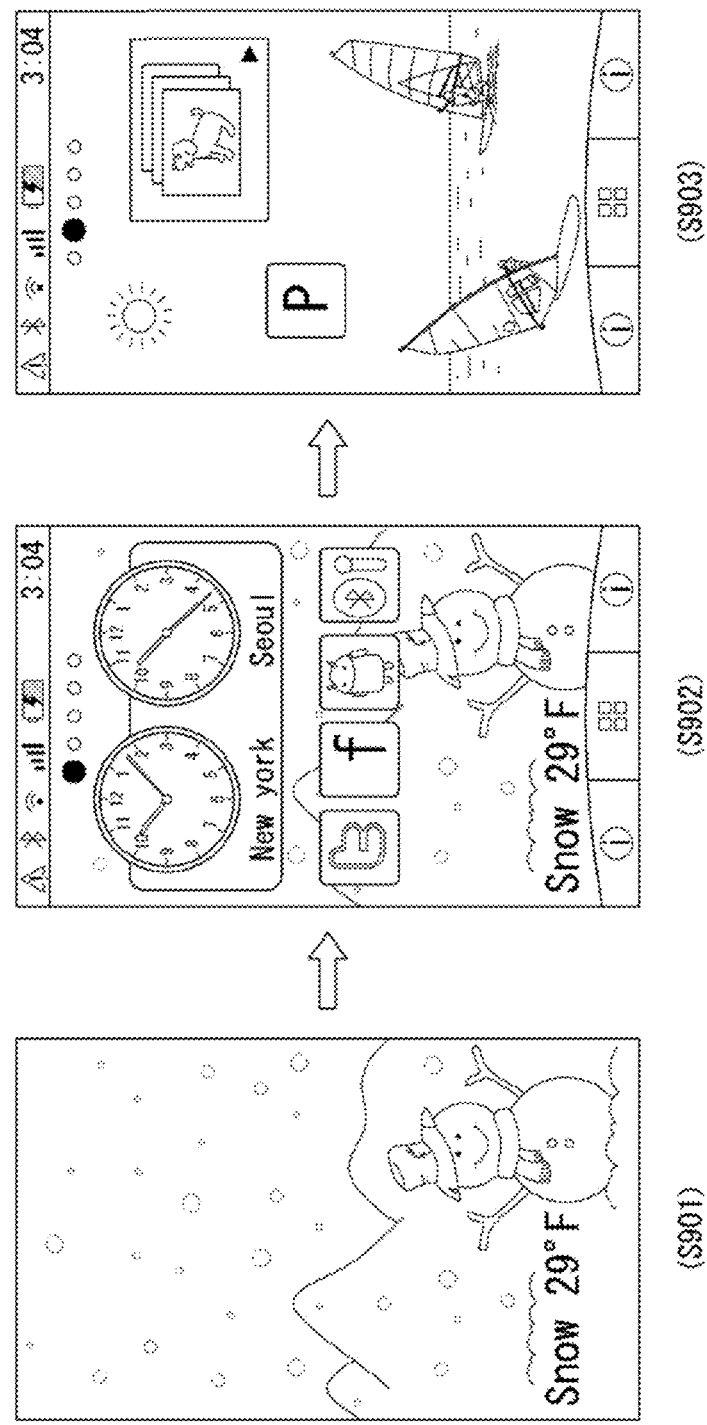
FIGS. 12 and 13 show examples of entering into a home screen and displaying the home screen while an application is executed in a mobile terminal according to an embodiment.

FIG. 12 shows an example of displaying a home screen upon entering into the home screen while in execution of an application.

Referring to FIG. 12, the controller 180 may execute a weather application (S901). When an entrance into the home screen is requested while the weather application is ongoing, the controller 180 may pause or terminate the weather application and enter into the home screen (S902). The controller 180 may display an execution image immediately before the weather application is paused or terminated as the background image of the home screen. Thereafter, when a page shift (or page change) to another page in the home screen is requested, the controller 180 may perform the page shift (or page change) from the current page to another page and display the shifted page (or changed page) on the screen (S903). When a page shift occurs after entering into the home screen, the controller 180 may terminate display of the execution image of the application used as the background image when entering into the home screen. The controller 180 may display the background image originally set as the background image of the home screen.

Referring to FIG. 9, when a termination of the home screen is requested through the user input unit 130 or the touch screen (of the display 151) while being in the home screen (S606), the controller 180 may terminate display of the home screen. The controller 180 may re-execute the application that was in execution immediately prior to entrance into the home screen (S607). As the home screen is terminated, when the application is re-executed, the controller 180 may put the application back to the state right before entrance into the home screen based on the last entrance operation and the last execution image of the application that was stored in the memory 160 immediately prior to entrance into the home screen. Accordingly, even when entering into the home screen while the application is in execution, after the home screen is terminated, a user may execute the application again under a same state as a previous state.

Figure 13:
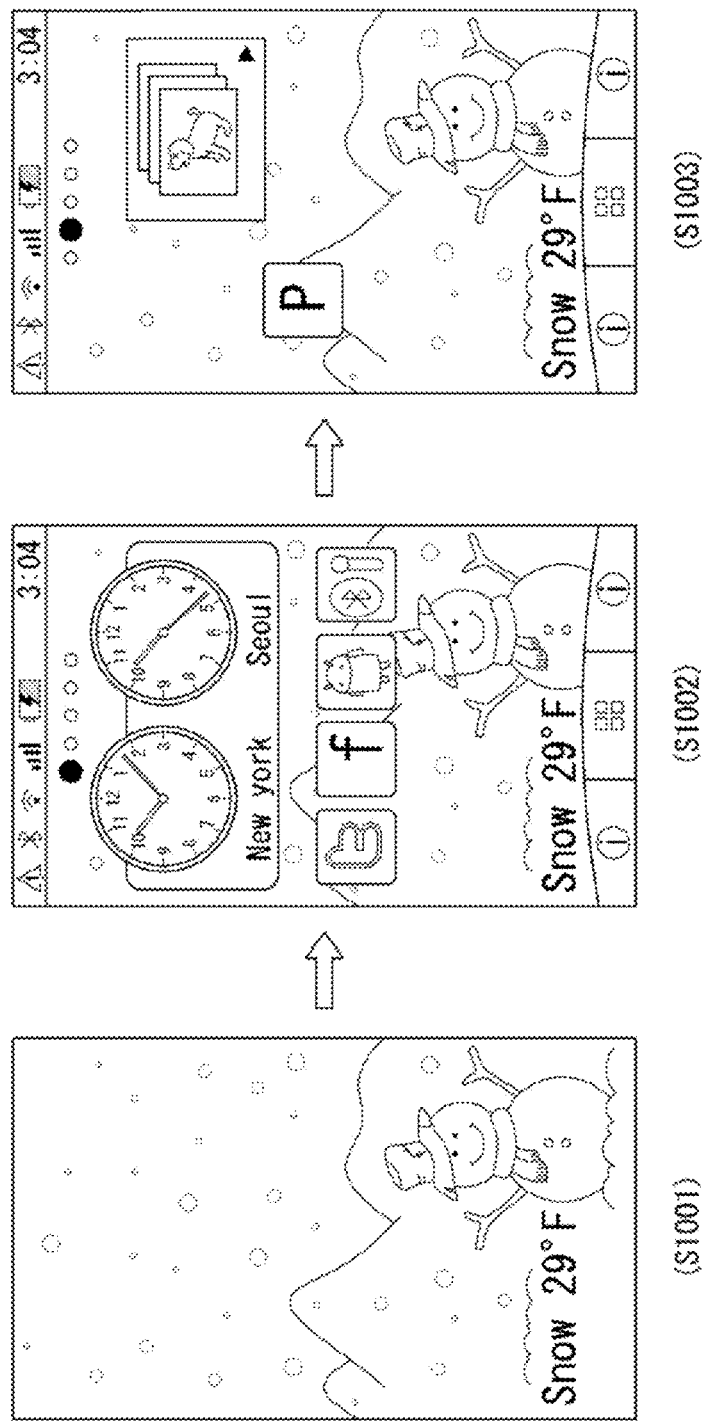

Although it has been described that when a page shift (or page change) occurs after entrance into the home screen, display of the execution image of the application used as the background image immediately after entrance into the home screen is terminated, embodiments not limited thereto. According to an embodiment, even when entering into the home screen while the application is in execution and a page shift (or page change) takes place in the home screen, the controller 180 may continue to display, as the background image of the home screen, the execution image of the application that was in execution prior to entrance into the home screen. For example, as shown in FIG. 13, when an entrance into the home screen is requested while a weather application is in execution (S1001), the controller 180 may enter into the home screen (S1002). The controller 180 may display as the background image the execution image of the weather application immediately prior to entrance into the home screen. Thereafter, when a shift (or change) to another page in the home screen is requested, the controller 180 may shift (or change) to the requested page and display the item in the corresponding page on the screen (S1003). The execution image of the weather application may be continuously displayed as the background image of the home screen.

According to the embodiment described in connection with FIGS. 9 to 13, a user may identify information through items on the home screen while the application is in execution by entering into the home screen without terminating the application. Further, since the items on the home screen are displayed on the screen on which the executing application is also displayed in an overlapping manner, a user may identify both the execution image of the application and information on the items arranged on the home screen.

A method of controlling the mobile terminal 100 and an operation of the mobile terminal 100 according to an embodiment may be described with reference to FIGS. 14 to 29.

Figure 14:
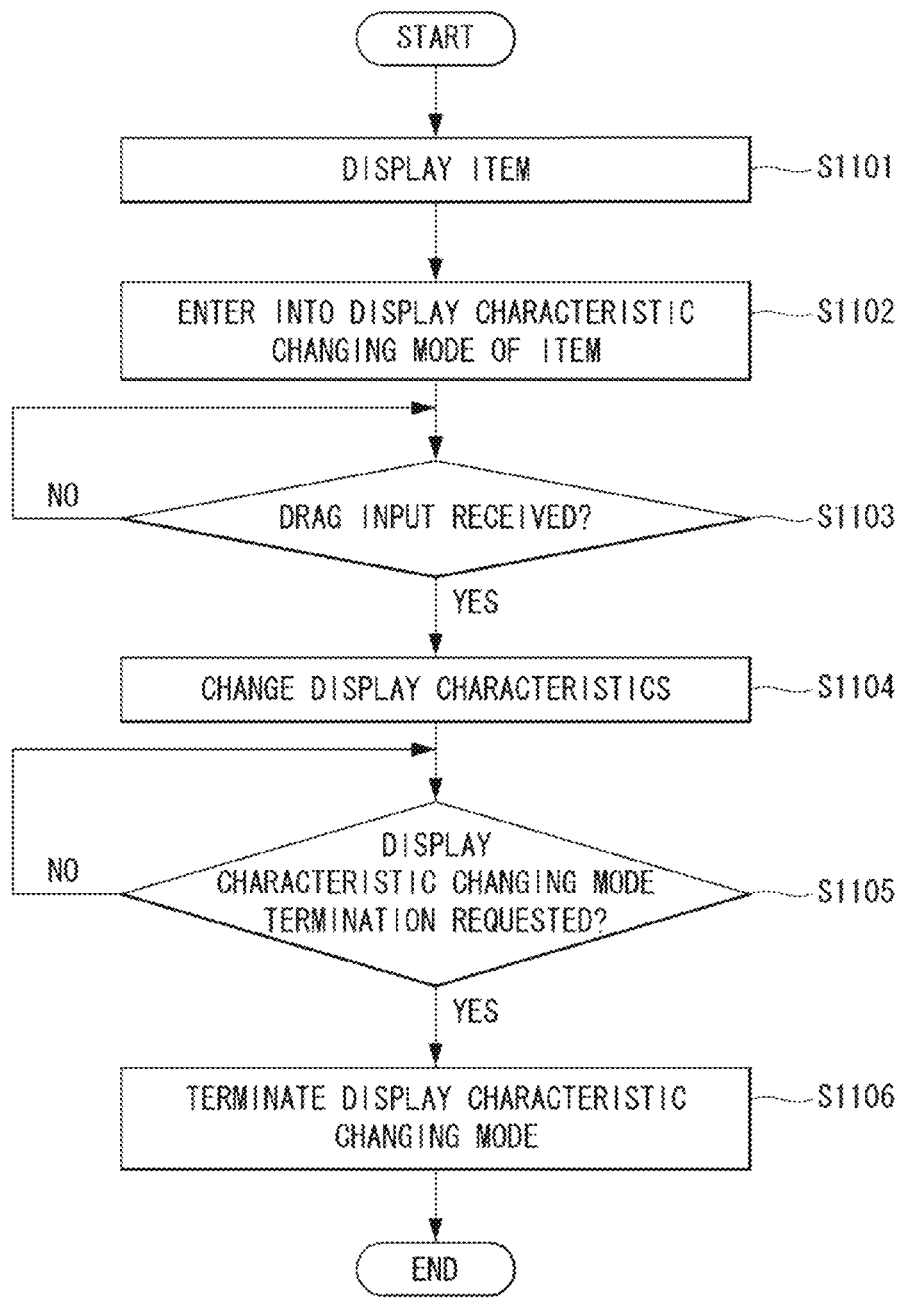
FIG. 14 is a flowchart of a method of controlling a mobile terminal according to an embodiment.

FIG. 14 is a flowchart of a method of controlling the mobile terminal 100 according to an embodiment. FIGS. 15 to 29 show a method of controlling the mobile terminal 100 according to an embodiment. Other embodiments and configurations may also be provided.

Referring to FIG. 14, the controller 180 may enter into the home screen based on a control input through the user input unit 130 or the touch screen (of the display 151). Accordingly, the controller 180 may display any one of the pages in the home screen and display items on the corresponding page (S1101). The icons may include shortcut icons, widgets, home applications, and/or group icons, for example.

The controller 180 may receive a request for changing display characteristics (hereinafter referred to as a display characteristic changing request) on any one of the items displayed on the screen based on a control input through the user input unit 130 or the touch screen (of the display 151). Accordingly, the controller 180 may enter into a mode for changing the display characteristics on the items (hereinafter referred to as a display characteristic changing mode) (S1102). For example, when an item displayed on the screen is touched during a predetermined time, the controller 180 may receive a display characteristic changing request on the corresponding item. Further, the controller 180 may also receive a display characteristic changing request when an item is multi-touched.

Figure 15:
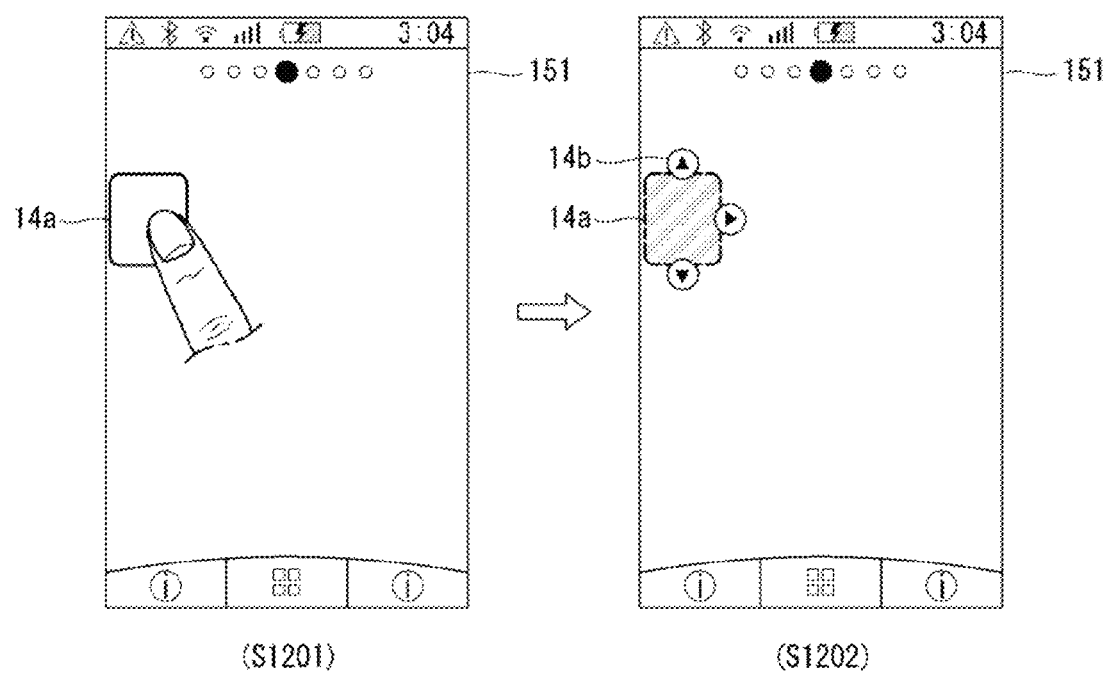
FIGS. 15 and 16 show examples of entering into a mode of changing display characteristics of an item in a mobile terminal according to an embodiment.
Figure 16:
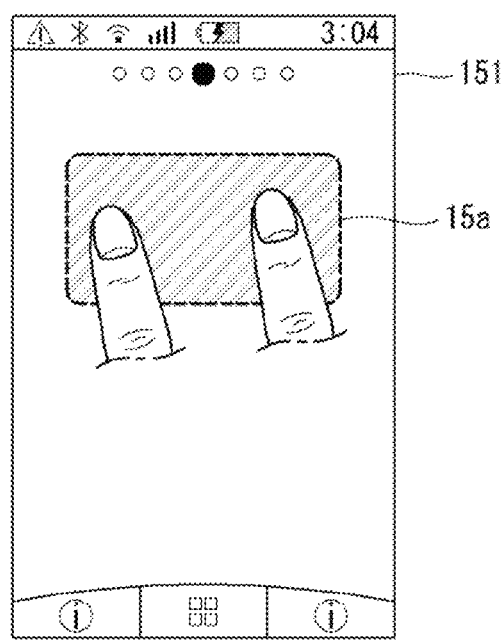

FIGS. 15 and 16 show examples of entering into a display characteristic changing mode.

Referring to FIG. 15, when an item 14a displayed on the home screen is touched for a predetermined time (S1201), the controller 180 may enter into a display characteristic changing mode for the selected item 14a. Accordingly, the controller 180 may change display characteristics of the item 14a based on a drag input starting from a display area of the item 14a.

As shown in FIG. 15, the controller 180 may also display a direction indicator 14b allowing a displayed size of the item 14a to change. To display the direction indicator 14b, the controller 180 may identify an area on which an additional item may be arranged in the page of the home screen. Based on the identified area, the controller 180 may display the direction indicator 14b. The direction indicator 14b may allow a user to intuitively identify in what direction the item 14a may expand.

Referring to FIG. 16, when an item displayed on the screen is multi-touched, the controller 180 may enter into a display characteristic changing mode of the item 15a. The controller 180 may change display characteristics of the item 15a based on a drag input starting from any one of the multi-touched points.

Referring to FIG. 14, upon receiving a drag input through the touch screen (of the display 151) after entering into the display characteristic changing mode of an item (S1103), the controller 180 may change display characteristics of a selected item based on the received drag input (S1104).

The display characteristics may include a displayed size. According to an embodiment, the controller 180 may change a displayed size of an item based on a path of a received drag input. For example, upon receiving a drag input having a path connected from a display area of an item to an area outside of the displayed area, the controller 180 may expand the displayed size of the item. Upon receiving a drag input having a path connected from a point in the display area of the item to another point in the display area, the controller 180 may shrink (or reduce) the displayed size of the item.

The display characteristics may include a displayed shape. According to an embodiment, the controller 180 may change the displayed shape of an item into a shape of a shortcut icon, a widget, or a home application based on a path of a received drag input. The controller 180 may store a displayed shape corresponding to a displayed size of each item in the memory 160. When the displayed size of the item is changed due to the received drag input, the controller 180 may change the displayed shape of the item into a displayed shape corresponding to the changed displayed size. For example, to change display characteristics of a shortcut icon, the controller 180 may change the shape of the shortcut icon to a shape of a widget or home application based on a path of a drag input. As another example, to change display characteristics of a widget, the controller 180 may change the shape of the widget to a shape of a shortcut icon or home application based on a path of a drag input. As still another example, to change display characteristics of a home application, the controller 180 may change the shape of the home application to a shape of a shortcut icon or widget based on a path of a drag input.

The display characteristics may include a type of information displayed on an item. The controller 180 may delete or add information to be displayed on the item based on a path of a received drag input. The controller 180 may store, in the memory 160, information displayed on the item according to the displayed size or displayed shape of each item. When the displayed size or shape of the item is changed due to a received drag input, the controller 180 may change the information displayed on the item corresponding to the changed displayed size or shape.

Figure 17:
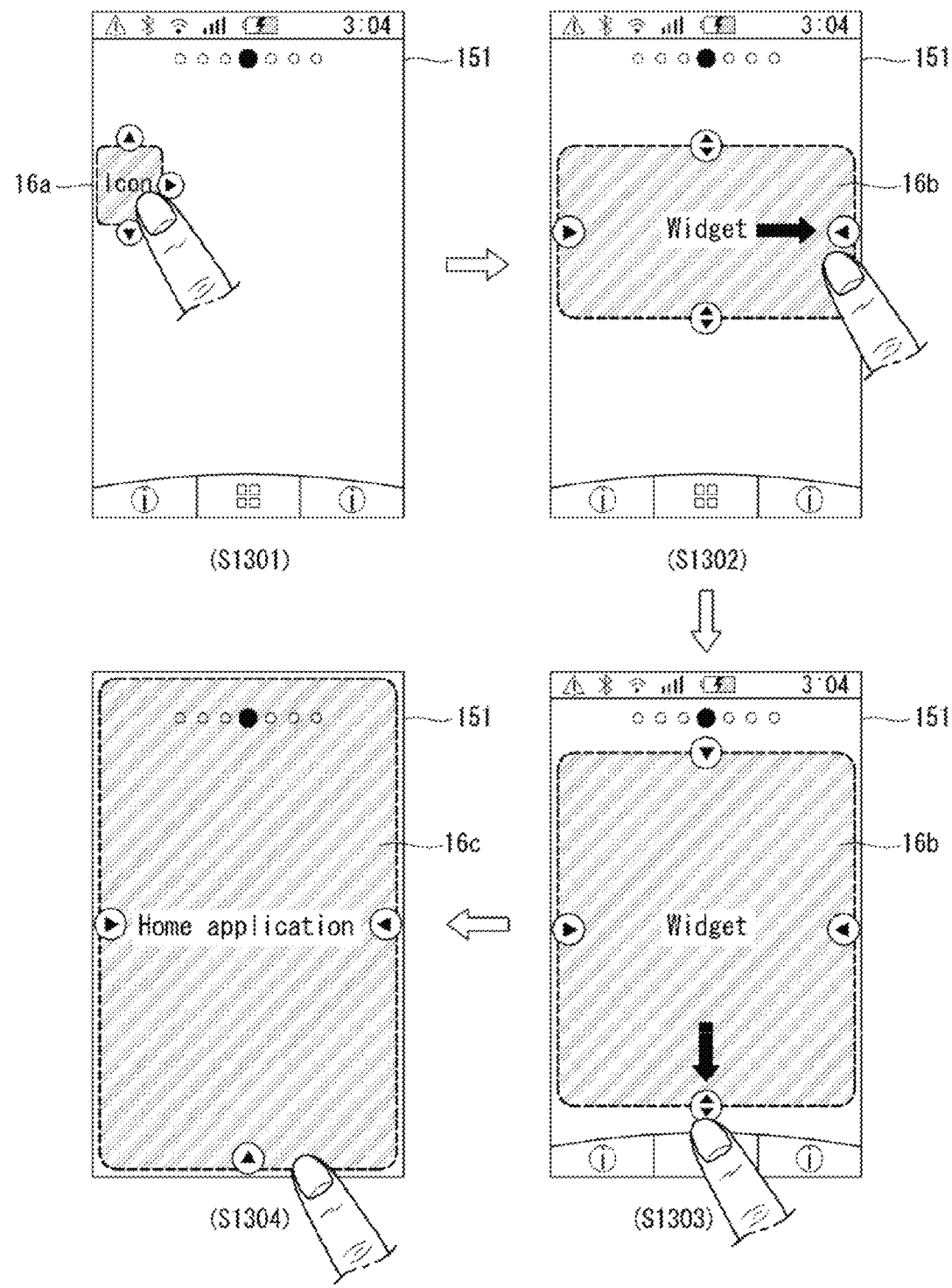
FIGS. 17 and 19 show examples of changing a display shape and a size of an item in a mobile terminal according to an embodiment.
Figure 18:
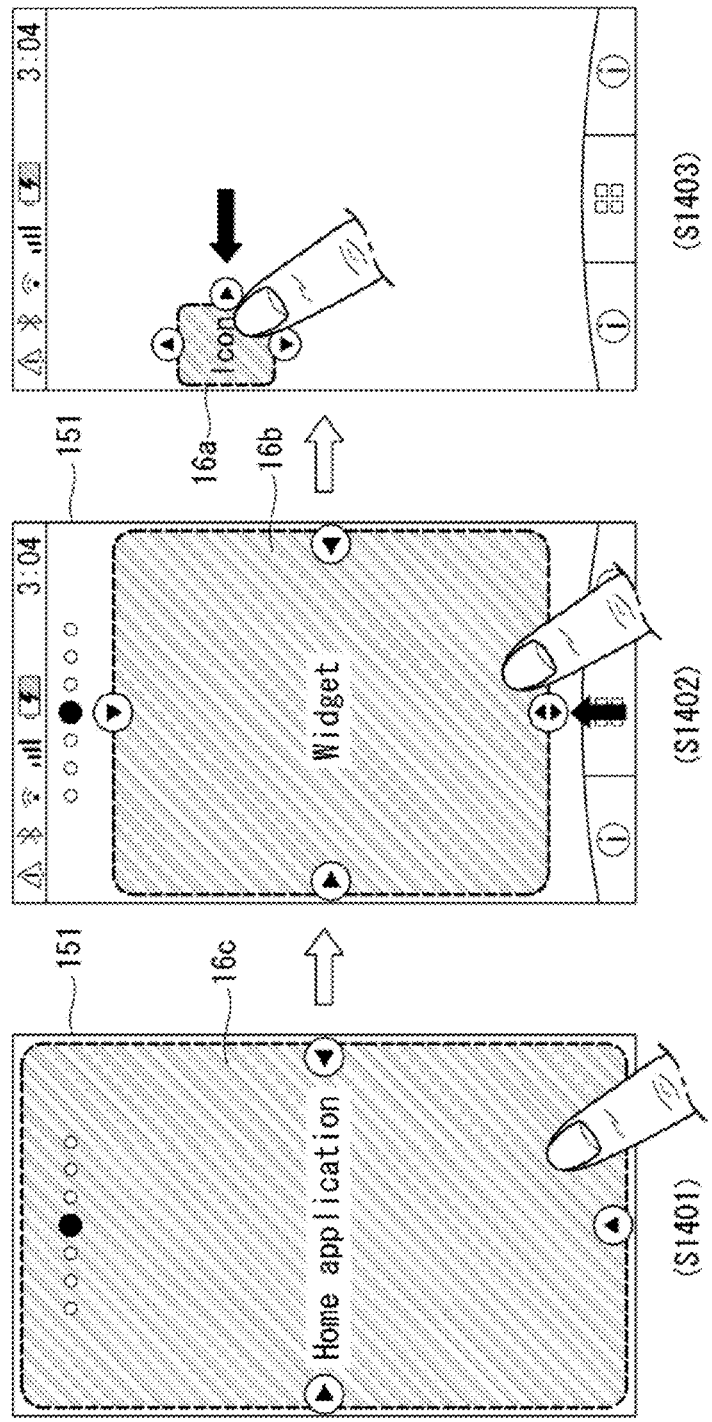
Figure 19:
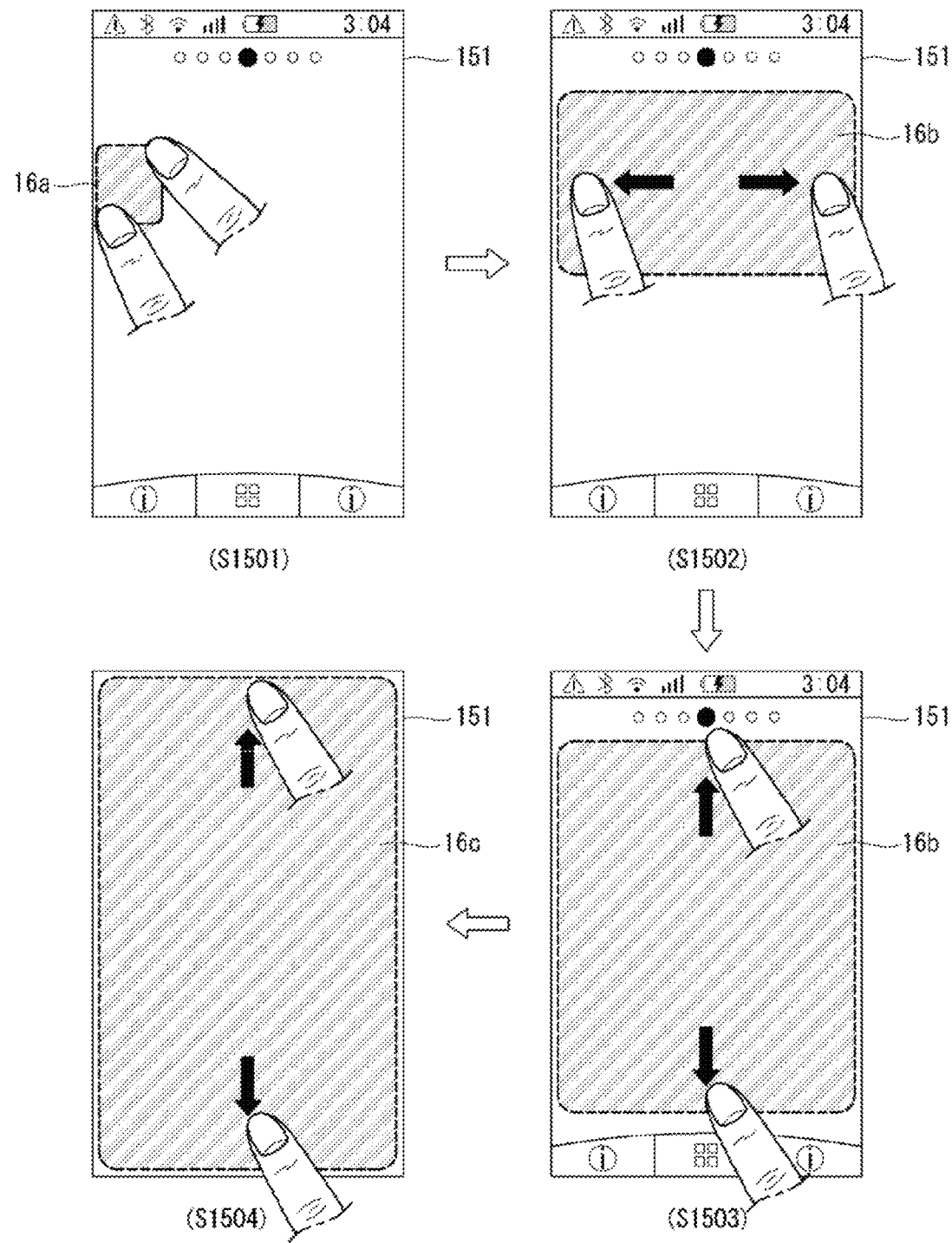

FIGS. 17 to 19 show examples of changing a displayed shape and a displayed size of an item.

Referring to FIG. 17, when a shortcut icon 16a displayed on the screen is touched for more than a predetermined time, the controller 180 may enter into a display characteristic changing mode for the shortcut icon 16a (S1301). Upon receiving a drag input starting at an area where the shortcut icon 16a is displayed, the controller 180 may change a displayed size of the shortcut icon 16a based on the received drag input. When the displayed size becomes more than a predetermined size, the controller 180 may transform (or change) the shortcut icon 16a to a widget 16b and display the widget 16b (S1302). When the displayed shape is changed from the shortcut icon 16a to the widget 16b, the controller 180 may include an execution result of a corresponding application. Even though the displayed shape is transformed to the widget 16b, the controller 180 may continuously change the displayed size of the widget 16b based on a received drag input (S1303). When the displayed size of the widget 16b increases, information displayed on the widget 16b may also increase. When the displayed size of the widget 16b is increased more than a predetermined size while being varied, the controller 180 may transform the widget 16b to a home application 16c and display the home application 16c (S1304). When the widget 16b is transformed to the home application 16c, the controller 180 may provide a home application on the home screen. A method of providing a home application on the home screen has been described with reference to FIGS. 4 to 8, and thus further detailed description thereof will be omitted.

Referring to FIG. 18, when the home application 16c on the home screen is touched for more than a predetermined time, the controller 180 may enter into a display characteristic changing mode for the corresponding item (S1401). The controller 180 may change a displayed size of the home application 16c based on a received drag input. When the displayed size is reduced to less than a predetermined size, the controller 180 may transform (or change) the home application 16c to the widget 16b and display the widget 16b (S1402). Even after the displayed shape is changed from the home application 16c to the widget 16b, the controller 180 may change the displayed size of the widget 16b based on a received drag input. When the displayed size of the widget 16*b* is reduced to less than a predetermined size, the controller 180 may transform (or change) the widget 16*b* to the shortcut icon 16*a* and display the shortcut icon 16*a* (S1403).

Referring to FIGS. 17 and 18, the controller 180 having entered into the display characteristic changing mode may also display an indicator 16*d* indicating a direction along which the displayed size of the item 16*a* may change. Accordingly, a user may intuitively identify in what direction the displayed size may change when the display characteristics of the selected item are changed.

Referring to FIG. 19, when the shortcut icon 16*a* displayed on the screen is multi-touched, the controller 180 may enter into a display characteristic changing mode for the shortcut icon 16*a* (S1501). Upon receiving a drag input starting at any one of the multi-touched points while the shortcut icon 16*a* is multi-touched, the controller 180 may change a displayed size or a displayed shape of the shortcut icon 16*a* based on the received drag input. For example, when the drag input is ongoing to an area outside of an area where the shortcut icon 16*a* is displayed, the controller 180 may expand the displayed size of the shortcut icon 16*a* based on the drag path. When the displayed size of the shortcut icon 16*a* is expanded to more than a predetermined size, the controller 180 may transform (or change) the shortcut icon 16*a* to the widget 16*b* and display the widget 16*b* (S1502). When a drag input is continuously received in the direction of expanding the displayed size even after the shortcut icon 16*a* is transformed to the widget 16*b*, the controller 180 may expand the displayed size of the widget 16*b* and display the expanded widget 16*b* (S1503). When the displayed size of the widget 16*b* expands, predetermined information may also be added to the widget 16*b*. When the displayed size of the widget 16*b* expands to more than a predetermined size, the controller 180 may transform the widget 16*b* to the home application 16*c* and display the home application 16*c* (S1504).

FIGS. 20 to 24 show examples of changing information displayed on an item.

As a displayed size or shape of an item is changed, information displayed on the item is also added or deleted. The type of information displayed on the item may vary depending on the displayed size or shape of the item.

For example, when an item is changed in a displayed shape to a widget, an execution result of an application corresponding to the widget may be displayed on the widget in the form of a preview. The information displayed on the widget in the preview form may be added or deleted based on the displayed size of the widget. For example, when the displayed shape of the item is changed to the widget, the controller 180 may display on the widget an application corresponding to the widget or a list of functions of the corresponding application. As another example, when the displayed shape of the item is changed to the widget, the controller 180 may display on the widget a list of content provided by the corresponding application. As an even further example, when the displayed shape of the item is changed to a home application, the controller 180 may display an execution image of the corresponding application on the entire screen. When the displayed size of a group icon expands, the controller 180 may display a list of grouped corresponding icons in the form of a widget.

Figure 20:
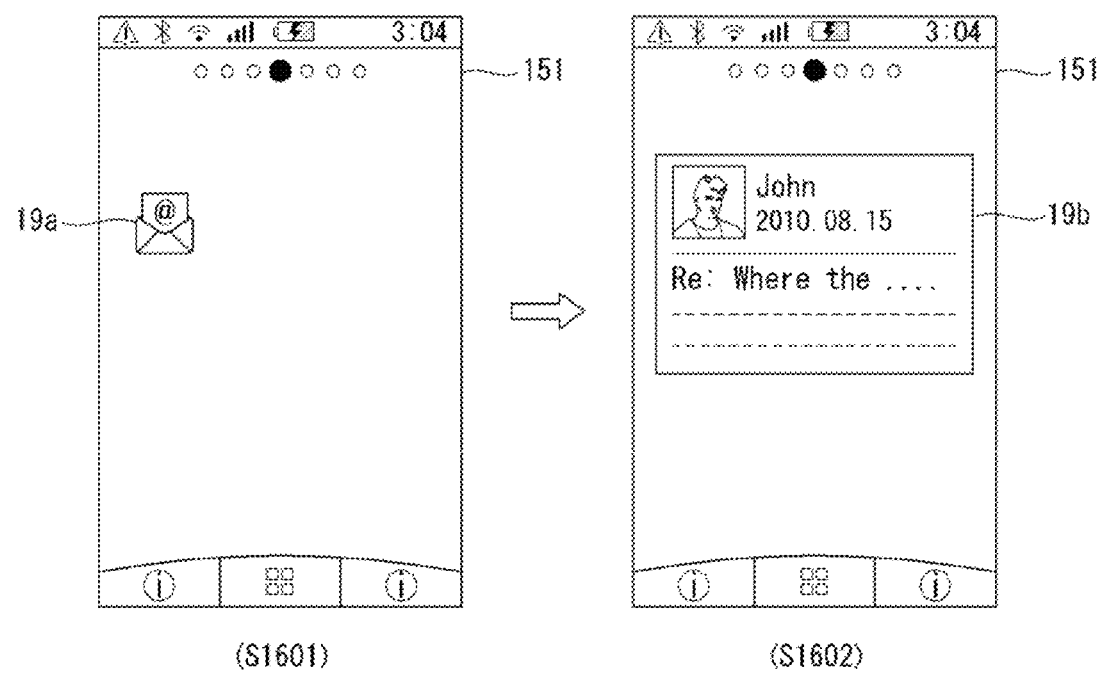
FIGS. 20 to 24 show examples of changing information displayed on an item in a mobile terminal according to an embodiment.

Referring to FIG. 20, the controller 180 may display a shortcut icon 19*a* representing an email application on the home screen (S1601). When a request for changing the display characteristics of the shortcut icon 19*a* is received and thus the displayed size of the icon 19*a* expands, the controller 180 may transform the shortcut icon 19*a* to a widget 19*b* and display the widget 19*b* (S1602). Accordingly, the controller 180 may display, on the widget 19*b*, preview information related to the email application, for example, a preview image of an email recently received. Thereafter, the information displayed on the widget 19*b* may be newly added or changed depending on the displayed size of the widget 19*b*. As shown in FIG. 20, the information displayed on the widget 19*b* may be a preview image of an execution result of the corresponding application. For example, in an example of an alarm application, preset alarm information may be displayed on the widget. In the example of a scheduling application, preset scheduling information may be displayed on the widget, and the scheduling information may be changed from daily scheduling information through weekly and monthly scheduling information to yearly scheduling information depending on the displayed size of the widget.

Figure 21:
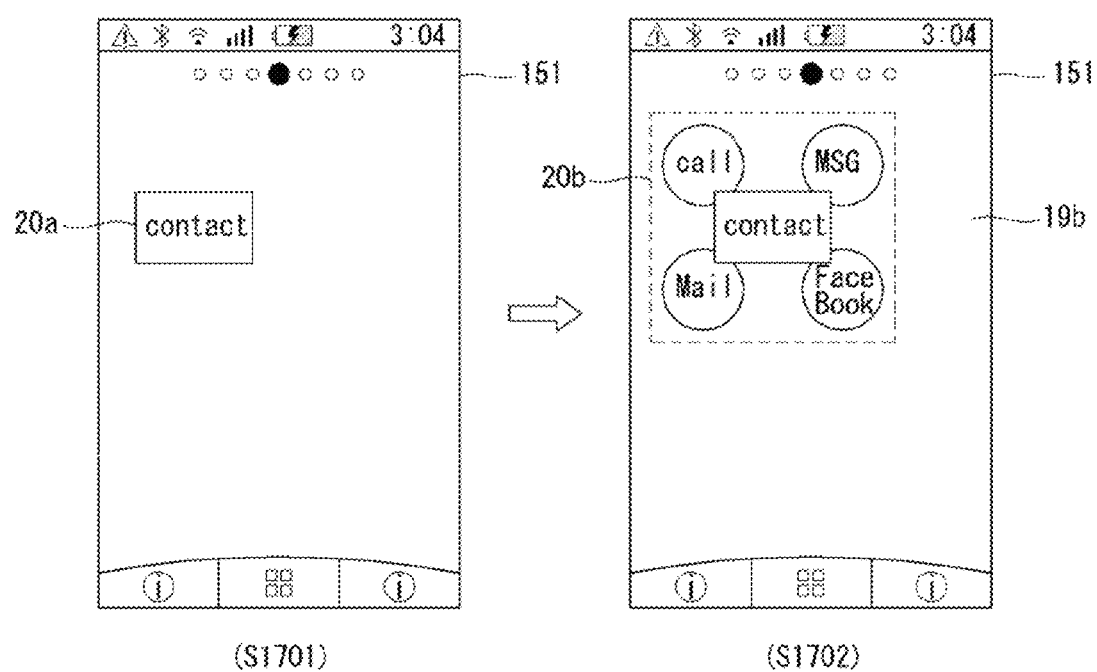

Referring to FIG. 21, the controller 180 may display a shortcut icon 20*a* representing an address book application on the home screen (S1701). When the displayed size of the shortcut icon 20*a* expands, the controller 180 may display a list of applications or functions executable in association with the address book application in combination with the shortcut icon 20*a* in the form of a widget 20*b* (S1702).

Figure 22:
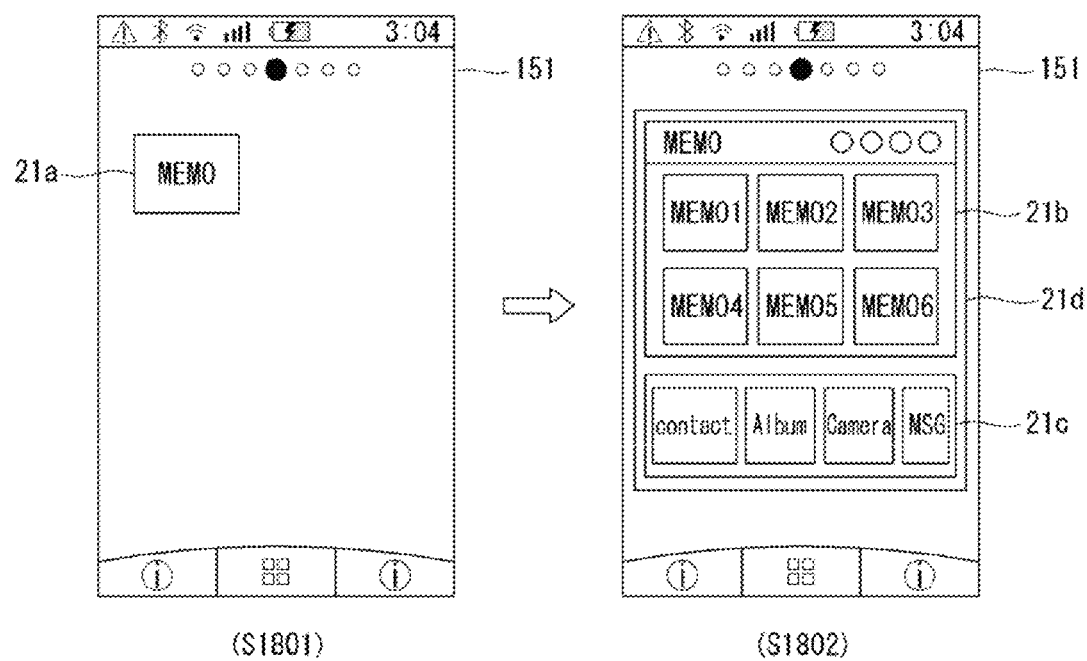

Referring to FIG. 22, the controller 180 may display a shortcut icon 21*a* representing a memo application on the home screen (S1801). When the displayed size of the shortcut icon 21*a* expands, the controller 180 may display a widget 21*d* combined with a list 21*b* of pre-stored memos displayed in the form of a preview image and a list 21*c* of applications executable in association with the memo application rather than the shortcut icon 21*a* (S1802).

Figure 23:
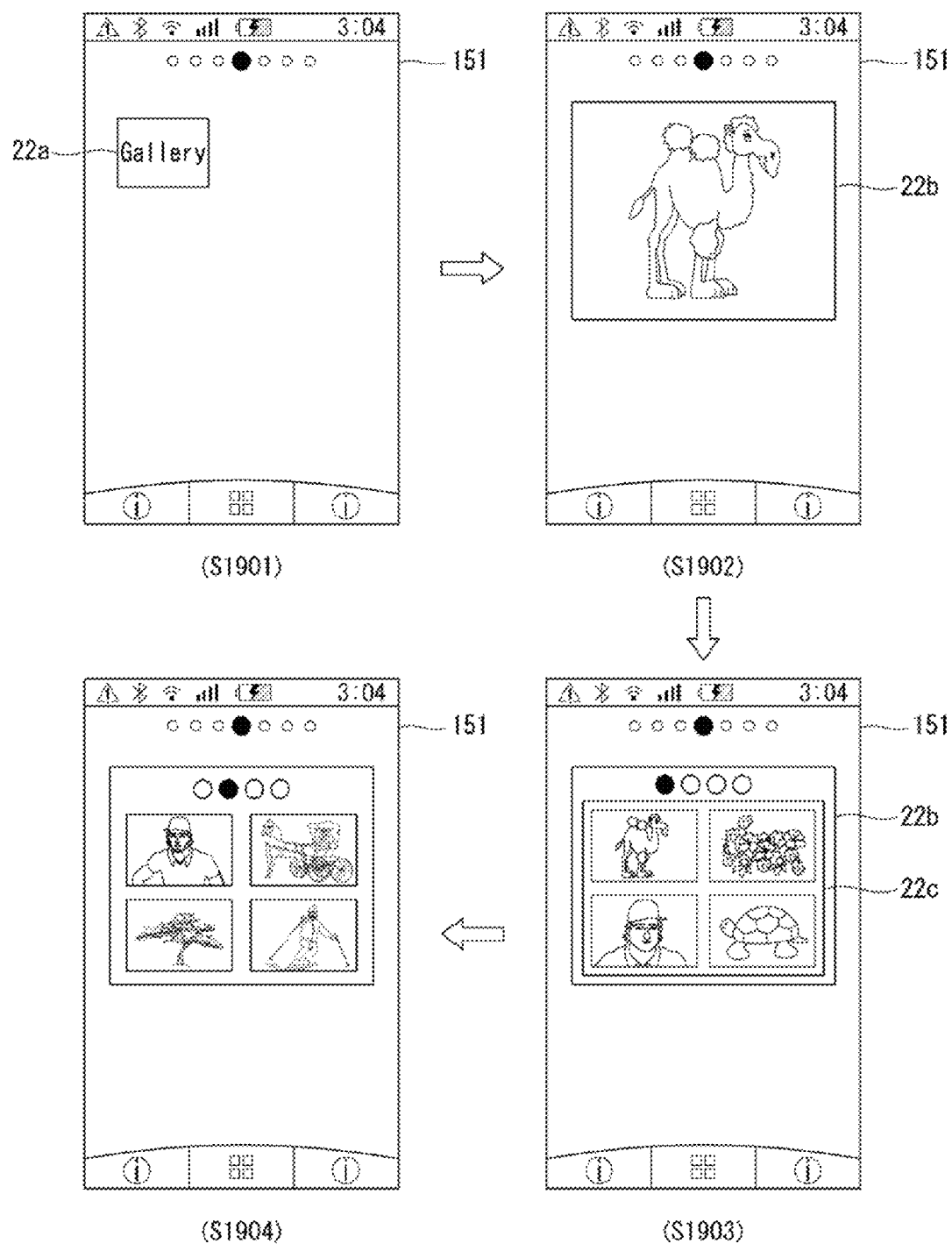

Referring to FIG. 23, the controller 180 may display a shortcut icon 22*a* representing an album application on the home screen (S1901). When the displayed size of the shortcut icon 22*a* expands, the controller 180 may display any one of a plurality of pre-stored images in the form of a widget 22*b* (S1902). When the displayed size of the widget 22*b* expands to more than a predetermined size, the controller 180 may display a list 22*c* of pre-stored widgets on the widget 22*b* (S1903). A number of images displayed in the preview form on the widget 22*b* from among images included in the image list 22*c* may vary depending on the displayed size of the widget 22*b*. Accordingly, the image list 22*c* may be divided into a plurality of pages. The controller 180 may display any one of the plurality of pages on the widget 22*b*. The controller 180 may shift (or change) the page to another page and display the shifted page (or changed page) based on a received drag input in an area where the widget 22*b* is displayed (S1904).

Figure 24:
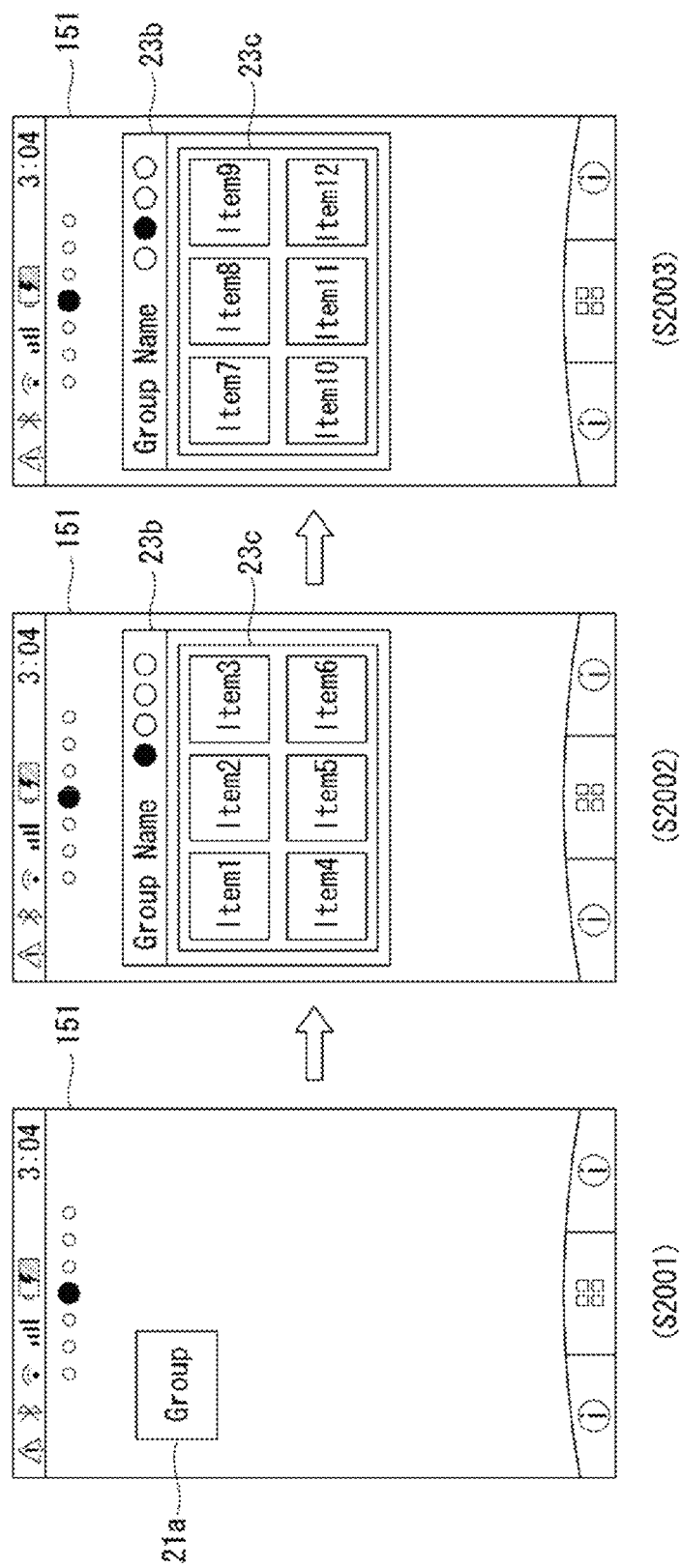

Referring to FIG. 24, the controller 180 may display a group icon 23*a* corresponding to a group of items on the home screen (S2001). When the displayed size of the group icon 23*a* expands, the controller 180 may display a list 23*c* of the grouped items in the form of a widget 23*b* (S2002). The list of the grouped items may be divided into a plurality of pages depending on the displayed size of the widget 23*b*. The controller 180 may display any one of the plurality of pages on the widget 23*b*. The controller 180 may shift or change the page including the list 23*c* to another page and display the shifted page (or changed page) based on a received drag input in an area where the widget 23*b* is displayed (S2003).

Referring to FIG. 14, while changing the display characteristics of the item, the controller 180 may receive a request for terminating the display characteristic changing mode. For example, while changing the display characteristics of the item based on a received drag input, the controller 180 may receive a request for terminating the display characteristic changing mode when a touch input is received at a different area from an area where the item is displayed. While changing the display characteristics of the item based on a received drag input while the item is multi-touched, the controller 180 may receive a request for terminating the display characteristic changing mode when a touch input of at least one of a plurality of multi-touched points is released.

In response to the request for terminating the display characteristic changing mode for the item (S1105), the controller 180 may terminate the display characteristic changing mode for the selected item (S1106). Upon terminating the display characteristic changing mode, the controller 180 may map the changed display characteristics with the corresponding item and store the mapped result in the memory 160. The controller 180 may display a message asking whether to store the changed display characteristics on the screen. Upon receiving a control input for storing the changed display characteristics from a user, the controller 180 may also map the changed display characteristics with the corresponding item and store the mapped result in the memory 160. In storing the changed display characteristics in the memory 160, when reentering into the page of the home screen currently displayed, the controller 180 may display the item reflecting the changed display characteristics based on the display characteristics stored in the memory 160.

Upon changing the displayed size of an item on the home screen, an arrangement space in the home screen may be insufficient. The mobile terminal 100 may solve problems of insufficient arrangement space in various methods.

Figure 25:
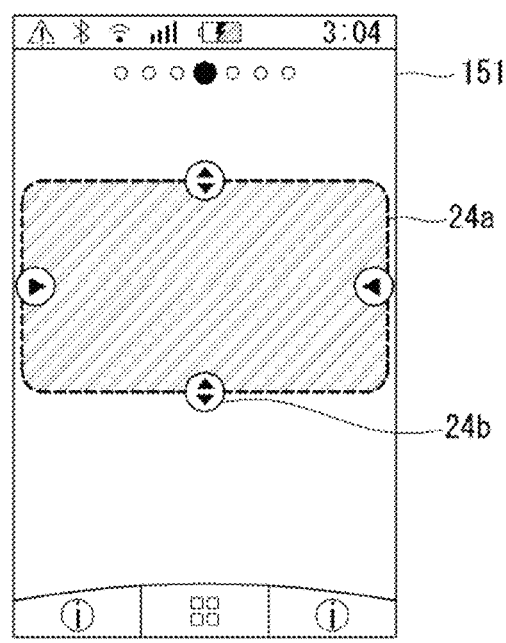
FIGS. 25 to 29 show examples of solving problems of insufficient arrangement spaces caused when a display size of an item is changed in a mobile terminal according to an embodiment.

When entering into a display characteristic changing mode for the item, the controller 180 may display a direction indicator indicating a direction in which the displayed size of the item is changeable on the screen. Referring to FIG. 25, the controller 180 displays a direction indicator 24*b* indicating a direction in which the displayed size of an item 24*a* may change. For example, when there is an extra arrangement space under the item 24*a*, the controller 180 may display the direction indicator 24*b* indicating that the displayed size of the item 24*a* may expand in a lower direction.

Figure 26:
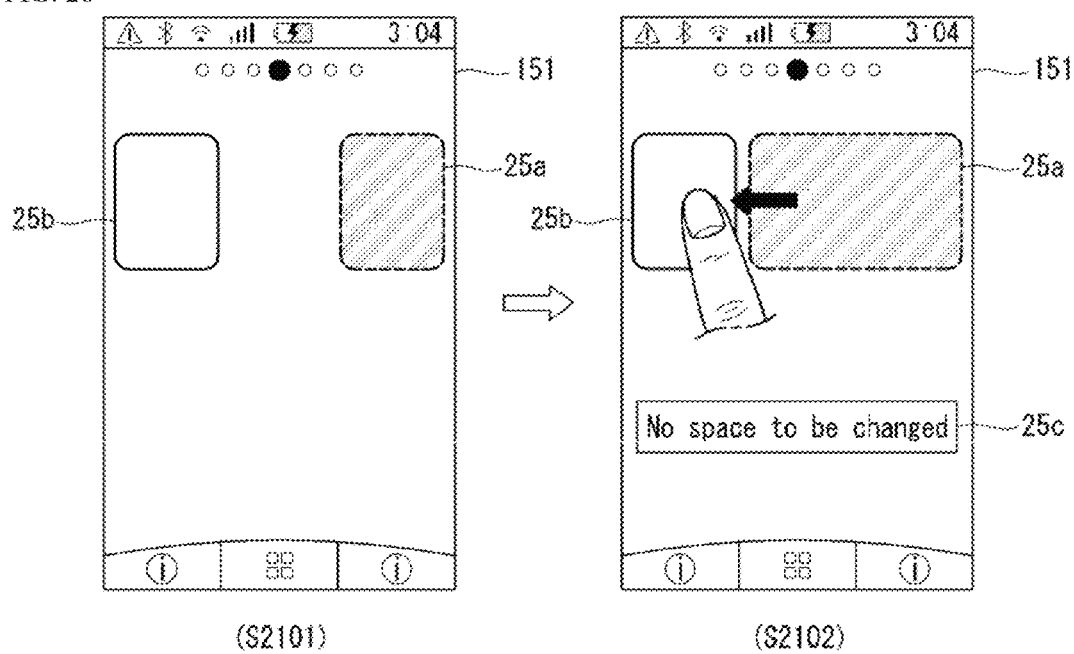

When it is difficult to further expand or shrink the displayed size of the item, the controller 180 may display information indicating such a fact on the screen. Referring to FIG. 26, the controller 180 may enter into a display characteristic changing mode for an item 25*a* (S2101). Accordingly, the controller 180 may change the displayed size of the item 25*a* based on a received drag input. When receiving a drag input allowing the displayed size of the item to expand to an area on which another item 25*b* is displayed or to an area other than an area on which the item may be displayed while the displayed size changes, the controller 180 may display a message 25*c* indicating that the displayed size of the item 25*a* may not expand (S2102).

Figure 27:
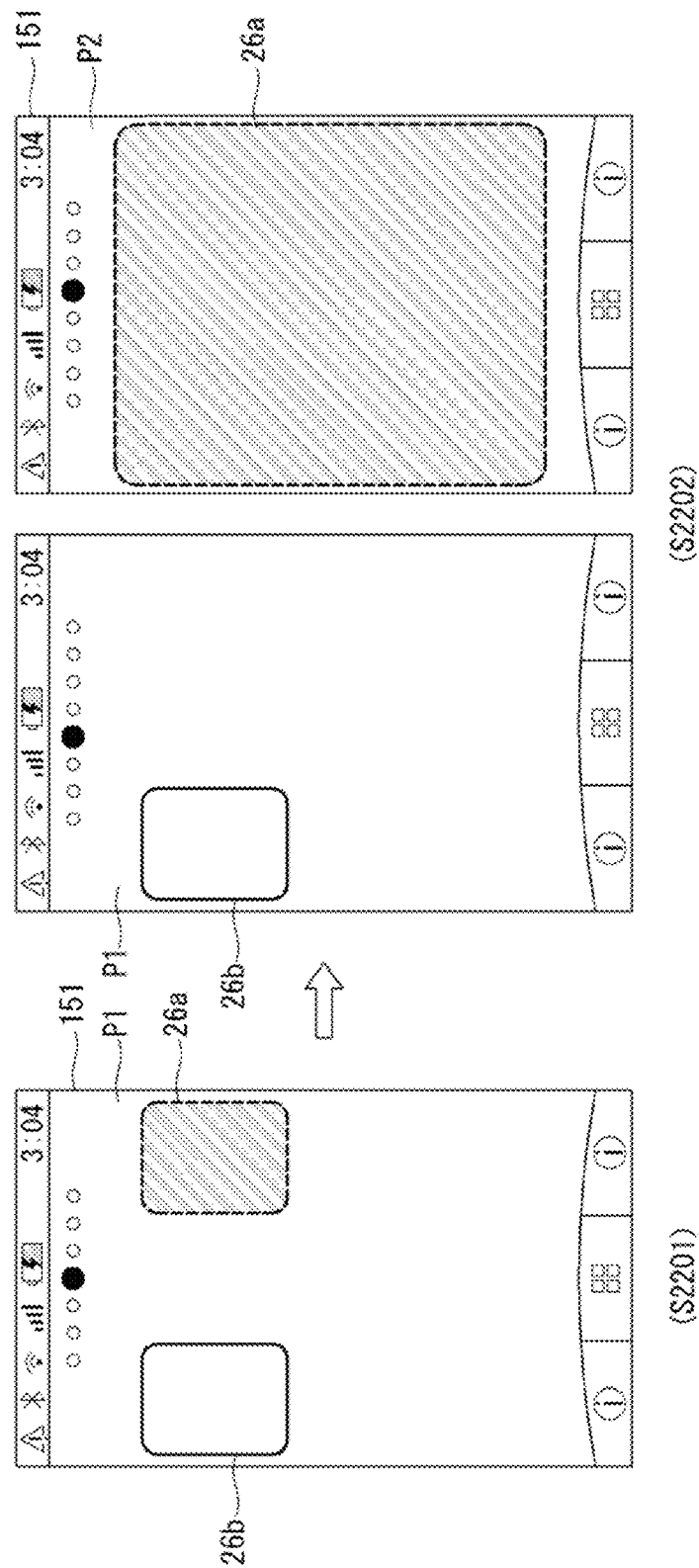

When there is an attempt to expand the displayed size of the item beyond an expandable area, the controller 180 may add a new page in the home screen. In addition to adding the new page, the controller 180 may also rearrange the item whose displayed size has been expanded and the other items arranged on the same page as the corresponding item on the newly added page. Referring to FIG. 27, the controller 180 may enter into a mode of changing the displayed size of an item 26*a* on the home screen (S2201). Accordingly, the controller 180 changes the displayed size of the item 26*a* based on a received drag input. When the arrangement space for items is insufficient in the page P1 on which the item 26*a* is arranged as the displayed size of the item 26*a* is expanded, the controller 180 may add a new page P2 in the home screen. The controller 180 may rearrange the item 26*a* whose displayed size has been changed on the newly added page P2 (S2202).

Figure 28:
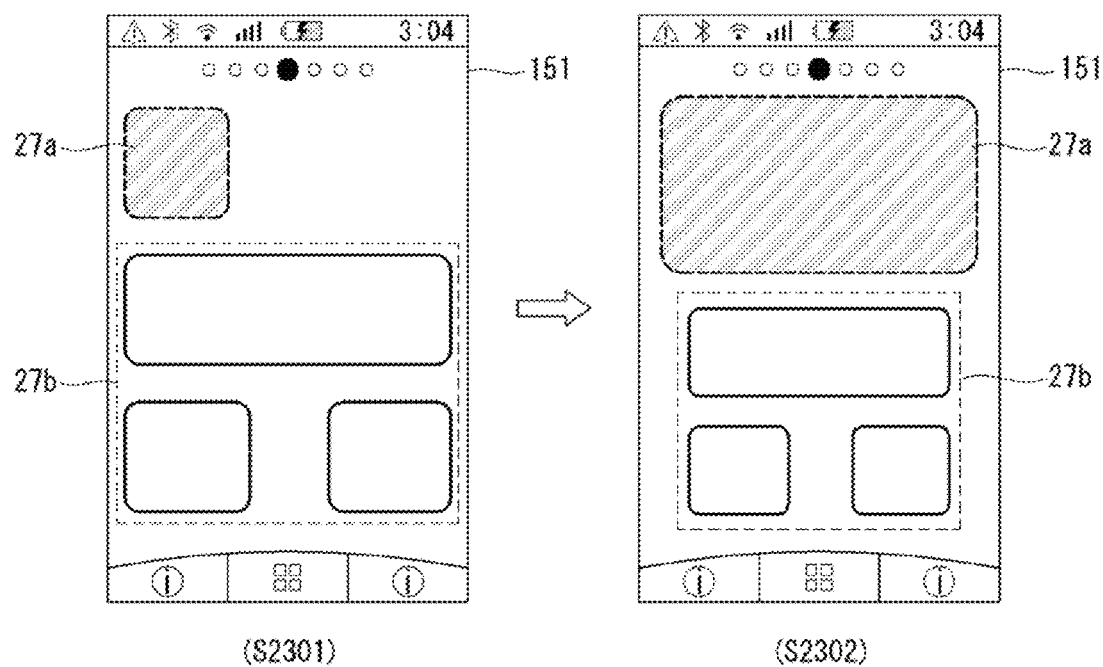

When there is an attempt to expand the displayed size of the item beyond an expandable area, the controller 180 may shrink (or reduce the displayed size of the items other than the item whose displayed size has changed and display the shrunken items. When an item on a page expands, the controller 180 may automatically shrink (or reduce) the displayed size of the other items and display the shrunken items. Referring to FIG. 28, the controller 180 may enter into a mode of changing the displayed size of an item 27*a* arranged on the home screen (S2301). Accordingly, the controller 180 may change the displayed size of the item 27*a* based on a received drag input. When an arrangement space for items is insufficient in the page P1 on which the item 27*a* is provided as the displayed size of the item 27*a* expands, the controller 180 may shrink (or reduce) the other items on the page P1 and display the shrunken items (S2302).

Figure 29:
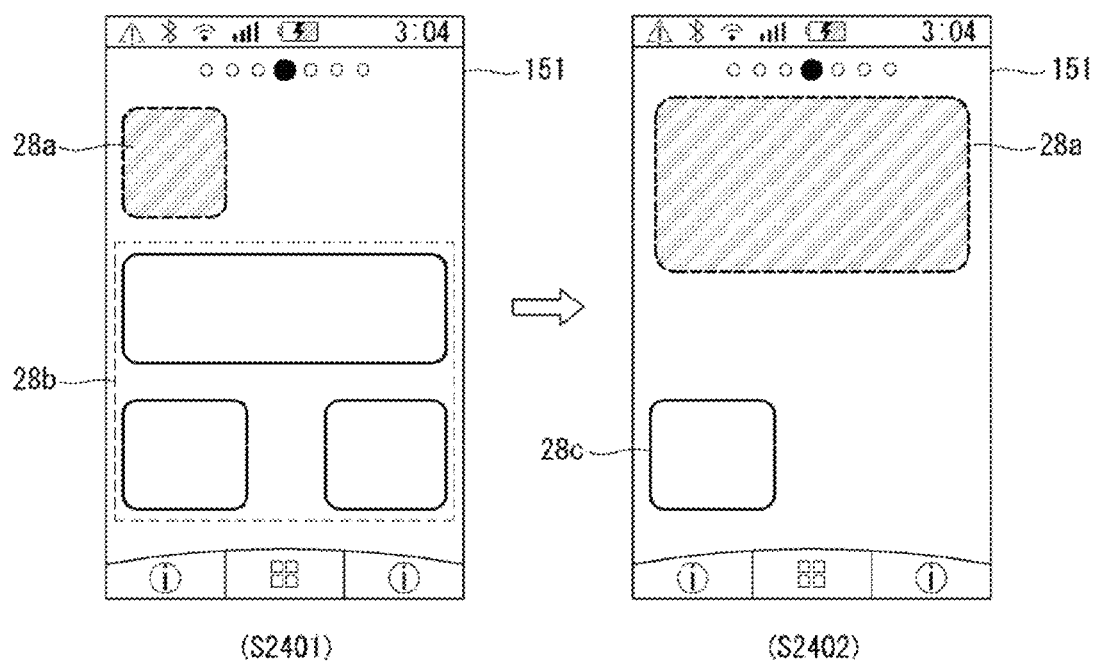

When there is an attempt to expand the displayed size of an item beyond an expandable area, the controller 180 may group the other items on the same page as that of the corresponding item and display the grouped items. When the displayed size of the selected item is expanded beyond the arrangement area on which the items may be arranged in the current page, the controller 180 may group the other items arranged on the same page and display a group icon representing the grouped icons. Referring to FIG. 29, the controller 180 may enter into a mode for changing the displayed size of an item 28*a* on the home screen (S2401). Accordingly, the controller 180 may change the displayed size of the selected item 28*a* based on a received drag input. When the displayed size of the item 28*a* expands beyond an expandable arrangement area, the controller 180 may group the items 28*b* other than the item 28*a* and display a group icon 28*c* representing the grouped icons (S2402).

A method of controlling the mobile terminal 100 and an operation of the mobile terminal 100 according to an embodiment may be described with reference to FIGS. 30 to 32.

Figure 30:
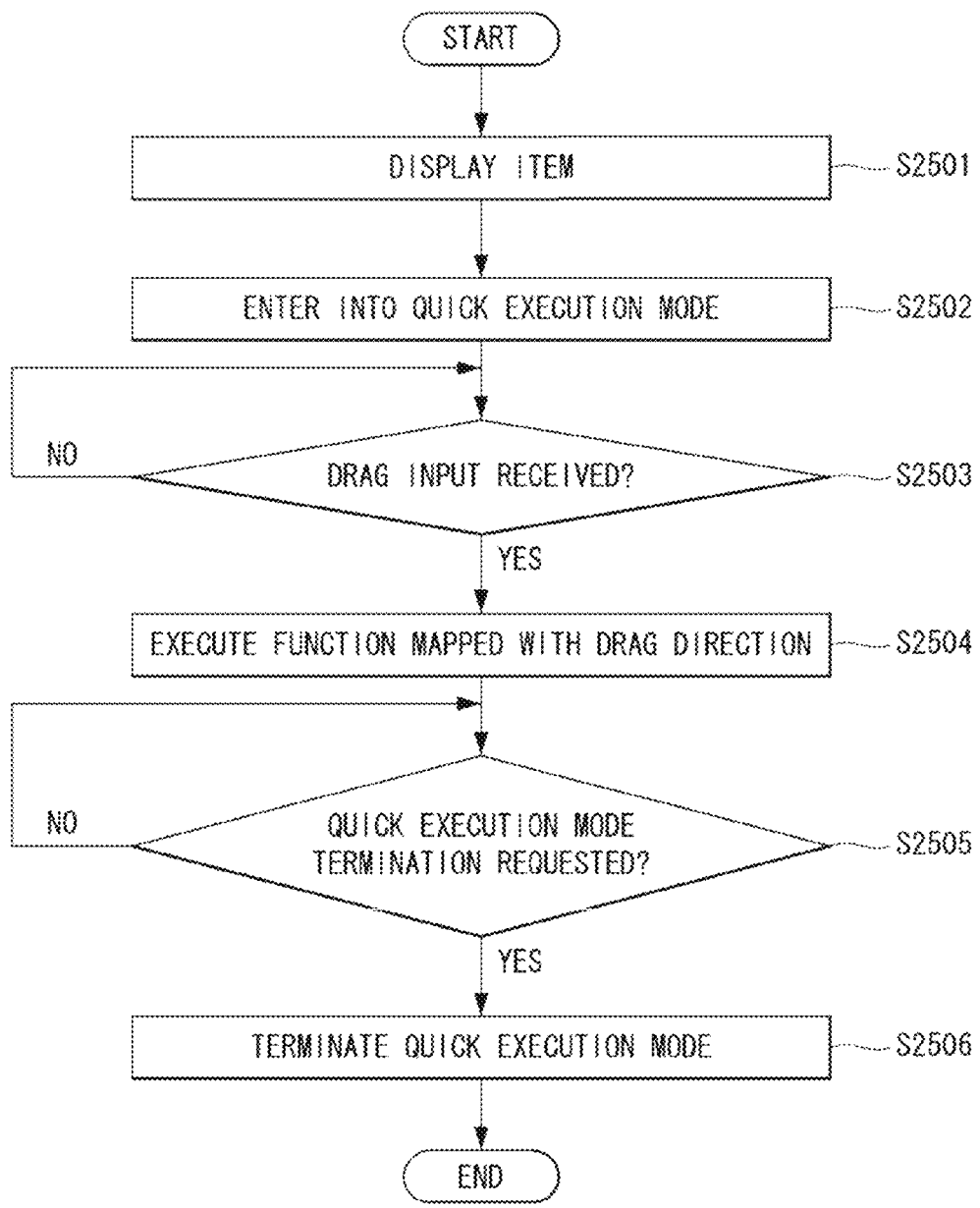
FIG. 30 is a flowchart of a method of controlling a mobile terminal according to an embodiment.

FIG. 30 is a flowchart of a method of controlling the mobile terminal 100 according to an embodiment. FIGS. 31 to 32 show a method of controlling the mobile terminal 100 according to an embodiment. Other embodiments and configurations may also be provided.

Referring to FIG. 30, the controller 180 may display at least one item on the screen (S2501). The item may include a shortcut icon, a group icon, and/or a widget arranged on the home screen. Further, the item may include a shortcut icon displayed on a menu screen. The item may include an icon displayed on a content list.

The controller 180 may enter into a quick execution mode for any one of items displayed on the screen based on a touch input received through the touch screen (of the display 151) (S2502). For example, when an item displayed on the screen is touched for more than a predetermined time, the controller 180 may enter into the quick execution mode whose function is associated with the corresponding item. The controller 180 may display items operating in the quick execution mode to be differentiated from the other items by changing the display characteristics of the selected items, such as expanding the displayed size of the selected items or making the selected items look as being further projected than the other items.

Upon receiving a drag input through the touch screen (of the display 151) while the item is touched (S2503), the controller 180 having entered into the quick execution mode may acquire a dragging direction of the received drag input. The controller 180 may execute a specific function associated with the item based on the acquired dragging direction (S2504). The controller 180 may map a dragging direction corresponding to at least one function associated with each item with the item and store the mapped result in the memory 160. Accordingly, when entering into the quick execution mode for an item, the controller 180 may execute a function corresponding to a dragging direction mapped with the item based on information stored in the memory 160.

FIGS. 31 and 32 show examples of executing a function associated with an item in a quick execution mode.

Referring to FIG. 31, the controller 180 may display shortcut icons on a menu screen. When a shortcut icon 30a corresponding to a Bluetooth application is touched for a predetermined time, the controller 180 may enter into a quick execution mode having a function associated with the icon 30a (S2601). After entering into the quick execution mode having the function associated with the Bluetooth icon 30a, the controller 180 may display the Bluetooth icon 30 in a magnified form compared to the other icons so as to indicate that the controller 180 entered into the quick execution mode having the function associated with the icon 30a. Upon receiving a drag input dragging the touched Bluetooth icon 30a in a right direction after having entered into the quick execution mode, the controller 180 may execute a Bluetooth inactivation function from among functions of the Bluetooth application (S2602). Upon receiving a drag input dragging the touched Bluetooth icon 30a in a left direction under the quick execution mode, the controller 180 executes a Bluetooth activation function (S2603). Upon receiving a drag input dragging the Bluetooth icon 30a in a lower direction under the quick execution mode, the controller 180 may display a list 30b of connectable external Bluetooth terminals on the screen (S2604). When the Bluetooth icon 30a is dragged in an upper direction while the list 30b is displayed on the screen, the controller 180 may terminate display of the list 30b and display the menu screen again (S2605).

The controller 180 may display, on the screen, information on what function is executed depending on a direction in which an item selected in the quick execution mode is dragged. Referring to FIG. 31, as the Bluetooth icon 30a is dragged in the right direction, the controller 180 may display information indicating that a quick execution function mapped with the right direction is the Bluetooth activation function in a form of overlapping the Bluetooth icon. As the Bluetooth icon 30a is dragged in the left direction, the controller 180 may display information indicating that a quick execution function mapped with the left direction is the Bluetooth inactivation function in a form of overlapping the Bluetooth icon.

Referring to FIG. 32, the controller 180 may display shortcut icons on a menu screen. When a shortcut icon 31a corresponding to a music application is touched for a predetermined time, the controller 180 may enter into a quick execution mode for the icon 31a (S2701). As the music icon 31a is dragged in the left or right direction under the quick execution mode, the controller 180 may shift a playing time point of currently playing music (S2702 and S2703). As the music icon 31a is dragged in a lower direction under the quick execution mode, the controller 180 may display a list 31b of playable music files on the screen (S2704). As the music icon 31a is dragged in an upper direction while the list 31b is displayed on the screen, the controller 180 may terminate display of the list 31b and display the menu screen again (S2705).

Returning to FIG. 30, upon receiving a request of terminating the quick execution mode while operating in the quick execution mode for the item (S2505), the controller 180 may terminate the quick execution mode for the item (S2506). According to the embodiment described with reference to FIGS. 30 to 32, the quick execution mode is operated while the selected item is kept touched. In this embodiment, when the touch on the selected is released, the quick execution mode on the item may be terminated.

According to the embodiment described with reference to FIGS. 30 to 32, the mobile terminal 100 may execute an application corresponding to an item represented as a shortcut icon or a widget by merely touching or dragging the item. Accordingly, a user convenience may be enhanced.

The above-described method of providing email service of the mobile terminal may be written as computer programs and may be implemented in digital microprocessors that execute the programs using a computer readable recording medium. The method of providing email service of the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and/or optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touchscreen; and
a controller configured to:
display, via the touchscreen, a first icon having a first size and corresponding to a first application,
in response to receiving a first touch input on the first icon, display an execution screen of the first application on the touchscreen,
in response to receiving a second touch input on the first icon, display a change indicator overlapping at least part of the first icon,
in response to receiving a third touch input on the change indicator, transition the first icon into a widget object on the touchscreen, wherein the widget object has a second size that is larger than the first size of the first icon,
display changing preview information corresponding to dynamic execution results of the first application within an outer boundary of the widget object, and
in response to receiving a fourth touch input on the widget object, display the execution screen of the first application on the touchscreen, wherein the execution screen is larger than the widget object for displaying additional information.

2. The mobile terminal of claim 1, wherein a size of the widget object is variable among a plurality of sizes, and each of the plurality of sizes is bigger than the size of the first icon.

3. The mobile terminal of claim 1, wherein the controller is further configured to:
cause the touchscreen to display a second indicator on at least part of an area of the widget object upon receiving a fifth touch input on the widget object; and
cause the touchscreen to display the first icon upon receiving a sixth touch input on the second indicator, wherein the widget object can be changed into the first icon.

4. The mobile terminal of claim 1, wherein the controller is further configured to cause the touchscreen to display each of a plurality of contents in each of separate display areas of the widget object.

5. The mobile terminal of claim 1, wherein the first icon corresponds to location information for directly executing the first application, and the widget object corresponds to a small window for operating an executed result of the first application.

6. The mobile terminal of claim 1, wherein the execution screen has a third size larger than the second size of the widget object and smaller than an entire area of the touchscreen.

7. The mobile terminal of claim 1, wherein the execution screen is displayed on an entire area of the touchscreen.

8. The mobile terminal of claim 1, wherein the first icon has a square shape and the widget object has a rectangular shape.

9. The mobile terminal of claim 1, wherein the preview information includes a graphical object.

10. The mobile terminal of claim 1, wherein the first icon is displayed on a home screen.

11. A mobile terminal comprising:
a touchscreen; and
a controller configured to:
display an icon corresponding to an application on a home screen,
in response to receiving a first input on the icon, display a first indicator on a part of the icon, wherein the first indicator indicates a direction for expanding a size of the icon,
in response to receiving a second input on the first indicator, expand the size of the icon,
in response to the size of the icon exceeding a predetermined icon size, change the icon into a widget on the home screen, wherein the widget includes information associated with execution results of the application,
in response to receiving a third input on the widget, expand a size of the widget, and
in response to the size of the widget exceeding a predetermined widget size, transition the touchscreen from displaying the widget on the home screen to displaying an application execution screen of the application.

* * * * *